United States Patent
Hayashi et al.

(10) Patent No.: US 9,617,361 B2
(45) Date of Patent: *Apr. 11, 2017

(54) CONDUCTIVE MEMBER FOR ELECTROPHOTOGRAPHIC IMAGE FORMING APPARATUS

(71) Applicant: TOKAI RUBBER INDUSTRIES, LTD., Komaki-shi, Aichi (JP)

(72) Inventors: Yosuke Hayashi, Aichi (JP); Shuichi Egawa, Aichi (JP); Yasuyuki Hayasaki, Aichi (JP)

(73) Assignee: SUMITOMO RIKO COMPANY LIMITED, Komaki, Aichi (JP)

( * ) Notice: Subject to any disclaimer, the term of this patent is extended or adjusted under 35 U.S.C. 154(b) by 324 days.

This patent is subject to a terminal disclaimer.

(21) Appl. No.: 14/278,288

(22) Filed: May 15, 2014

(65) Prior Publication Data

US 2014/0248067 A1    Sep. 4, 2014

Related U.S. Application Data

(63) Continuation of application No. PCT/JP2012/074020, filed on Sep. 20, 2012.

(30) Foreign Application Priority Data

Feb. 3, 2012 (JP) ................................. 2012-021623

(51) Int. Cl.

| | |
|---|---|
| *C08F 36/18* | (2006.01) |
| *B32B 27/18* | (2006.01) |
| *B32B 15/06* | (2006.01) |
| *C08C 19/18* | (2006.01) |
| *C08J 7/12* | (2006.01) |
| *C08F 36/06* | (2006.01) |
| *C08F 36/08* | (2006.01) |
| *C08F 299/02* | (2006.01) |
| *G03G 15/02* | (2006.01) |
| *G03G 15/08* | (2006.01) |
| *G03G 15/16* | (2006.01) |
| *C08C 19/25* | (2006.01) |
| *C08C 19/28* | (2006.01) |
| *C08K 5/3492* | (2006.01) |
| *C08K 5/101* | (2006.01) |
| *C08K 5/132* | (2006.01) |
| *C08K 5/20* | (2006.01) |
| *F16C 13/00* | (2006.01) |

(52) U.S. Cl.
CPC .............. *C08F 36/18* (2013.01); *C08C 19/18* (2013.01); *C08C 19/25* (2013.01); *C08C 19/28* (2013.01); *C08F 36/06* (2013.01); *C08F 36/08* (2013.01); *C08F 299/02* (2013.01); *C08J 7/12* (2013.01); *C08K 5/101* (2013.01); *C08K 5/132* (2013.01); *C08K 5/20* (2013.01); *C08K 5/34924* (2013.01); *G03G 15/0233* (2013.01); *G03G 15/0818* (2013.01); *G03G 15/1685* (2013.01); *F16C 13/00* (2013.01)

(58) Field of Classification Search
USPC .............................. 428/462, 625; 525/332.3
See application file for complete search history.

(56) References Cited

U.S. PATENT DOCUMENTS

| | | | |
|---|---|---|---|
| 3,843,487 A | * | 10/1974 | Perkins .................. C09J 121/00 156/334 |
| 4,771,093 A | | 9/1988 | Nakane et al. |
| 9,095,870 B2 | * | 8/2015 | Kashihara et al. G03G 15/0233 |
| 2013/0084428 A1 | | 4/2013 | Hayashi et al. |

FOREIGN PATENT DOCUMENTS

| | | |
|---|---|---|
| JP | 57-020733 A | 2/1982 |
| JP | 57-057726 A | 4/1982 |
| JP | 60-108438 A | 6/1985 |
| JP | 61-200139 A | 9/1986 |
| JP | 07-268005 A | 10/1995 |
| JP | 2002-539279 A | 11/2002 |
| JP | 2007-256709 A | 10/2007 |
| WO | 00/53638 A1 | 9/2000 |

OTHER PUBLICATIONS

Notification of Transmittal of Translation of the International Preliminary Report on Patentability (Chapter I or Chapter II) of International Application No. PCT/JP2012/074020 mailed Aug. 14, 2014 with forms PCT/IB/373 and PCT/ISA/237.

Supplementary European Search Report dated Dec. 17, 2015 issued in counterpart European Patent Application No. 12867229.2. (9 pages).

International Search Report, dated Dec. 18, 2012, issued in corresponding application No. PCT/JP2012/074020.

* cited by examiner

*Primary Examiner* — Tae H Yoon

(74) *Attorney, Agent, or Firm* — Westerman, Hattori, Daniels & Adrian, LLP

(57) ABSTRACT

A modified polymer body 1 has a polymer body 2 composed of a polymer material containing a carbon-carbon double bond and first binding parts 3 and second binding parts 4 bound to the surface of the polymer body 2. The first binding parts 3 are such that an organic group 6 having a functional group is bound via an isocyanuric acid skeleton 5 to the surface of the polymer body 2. The second binding parts 4 are such that an organic group 7 having a functional group is directly bound to the surface of the polymer body 2 without interposing an isocyanuric acid skeleton 5.

21 Claims, 7 Drawing Sheets

CONDUCTIVE MEMBER FOR ELECTROPHOTOGRAPHIC IMAGE FORMING APPARATUS

CROSS-REFERENCE TO RELATED APPLICATION

This application is a Continuation of International Application No. PCT/JP2012/074020 filed Sep. 20, 2012, which claims priority to Japanese Patent Application No. 2012-021623, filed Feb. 3, 2012. The entire contents of which are incorporated herein by reference.

TECHNICAL FIELD

The present invention relates to a conductive member for an electrophotographic image forming apparatus, more specifically to a conductive member for an electrophotographic image forming apparatus using a modified polymer body.

BACKGROUND ART

Conventionally, polymer bodies composed of polymer materials such as various resins and rubbers (including an elastomer) have been used in various fields. Polymer bodies are sometimes subjected to surface modification for use in order to impart surface functions according to the intended use.

For example, Patent Document 1 discloses a technique of applying surface treatment to a rubber vulcanizate with a solution containing, as a solute, a halogen compound having a functional group represented by the rational formula —CONX— (wherein X is a halogen atom) to decrease the friction on the surface of the rubber vulcanizate. Further, Patent Document 2 discloses a technique of halogenating the surface of a vulcanized rubber object with a halogenating agent, and treating the halogenated rubber surface with a polyfunctional amine-containing organic compound, thereby imparting adhesion properties. Furthermore, Patent Document 3 discloses a technique of introducing an F group, OH group or the like into the surface of a rubber layer of a charging roll which is used in an image forming device of an electrophotographic system, thereby imparting release properties to a toner external additive.

PRIOR ART DOCUMENTS

Patent Documents

Patent Document 1: JP-A-S60-108438
Patent Document 2: JP-T-2002-539279
Patent Document 3: JP-A-2007-256709

SUMMARY OF THE INVENTION

Problem to be Solved by the Invention

With respect to the above-described conventional techniques, the present applicant has developed a process for obtaining a modified polymer body by bringing a surface treatment liquid containing trichloroisocyanuric acid and an organic compound having a functional group and a carbon-carbon double bond into contact with the surface of a polymer body composed of a polymer material having carbon-carbon double bonds.

However, this process affords room for improvement in the following respects.

Specifically, according to the process, an organic group having a functional group can be bound via an isocyanuric acid skeleton to the surface of the polymer body. However, when the polymer body is treated with a surface treatment liquid, an organic compound having a functional group sometimes remains as an unreacted component in the surface of the polymer body. Since such an unreacted component is not bound to the surface of the polymer body, a surface function due to the functional group would not be developed accordingly. Also, such an unreacted component is disadvantageous also in developing the surface function due to the functional group over a long term.

The present invention has been made in light of such a background, and also has been made for the purpose of providing a conductive member for an electrophotographic image forming apparatus using a modified polymer body which has an improved surface function due to a functional group and easily develops the surface function over a long term.

Means for Solving the Problem

One aspect of the present invention resides in a conductive member for an electrophotographic image forming apparatus using a modified polymer body as a material for a portion including the outermost surface of the conductive member, wherein, the modified polymer body having, a polymer body composed of a polymer material containing carbon-carbon double bonds;

first binding parts bound to the surface of the polymer body, the first binding parts being such that an organic group having a functional group is bound via an isocyanuric acid skeleton to the surface of the polymer body; and second binding parts bound to the surface of the polymer body, the second binding parts being such that an organic group having a functional group is directly bound to the surface of the polymer body without interposing an isocyanuric acid skeleton.

Effects of the Invention

In the conductive member for an electrophotographic image forming apparatus, the modified polymer body has the polymer body composed of the polymer material containing the carbon-carbon double bonds and the first binding parts and the second binding parts which are bound to the surface of this polymer body. The first binding parts are such that the organic group having the functional group is bound via the isocyanuric acid skeleton to the surface of the polymer body. Therefore, the modified polymer body can basically develop a surface function due to the functional group, by virtue of the functional group possessed by the first binding parts. Also, the second binding parts are such that the organic group having the functional group is directly bound to the surface of the polymer body without interposing the isocyanuric acid skeleton. Therefore, the modified polymer body can additionally develop the surface function due to the functional group possessed by the second binding parts, as well as the surface function due to the functional group, as compared with the case where the polymer body has on the surface thereof the first binding parts alone without having the second binding parts. Also, the modified polymer body has the first binding parts and the second binding parts, and thus can have more functional groups on the surface thereof. Therefore, the modified polymer body easily develops the surface function over a long term, and is excellent in durability.

The present invention can thus provide a conductive member for an electrophotographic image forming apparatus using a modified polymer body which has an improved surface function due to the functional group and easily develops the surface function over a long term.

MODE FOR CARRYING OUT THE INVENTION

Figure 1:
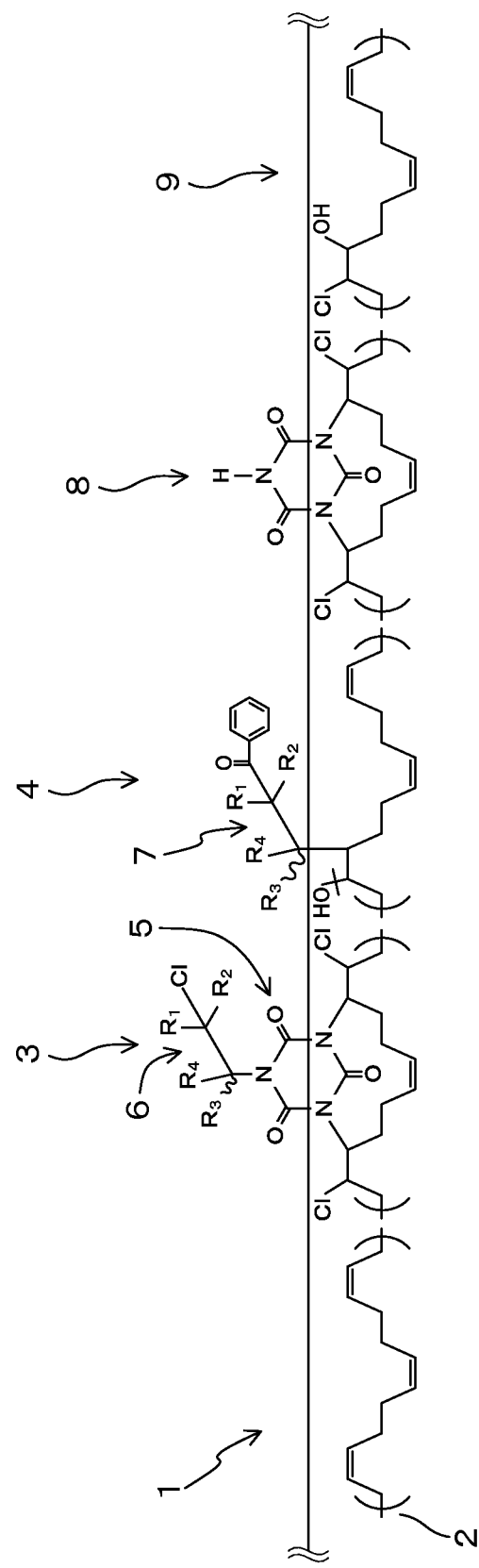
FIG. 1 is a view schematically showing an example of the surface state of a modified polymer body used in a conductive member for an electrophotographic image forming apparatus in an Example.

The conductive member for an electrophotographic image forming apparatus used in the modified polymer body will be explained. Hereinafter, the conductive member for an electrophotographic image forming apparatus may be referred to as "conductive member." The modified polymer body has the polymer body composed of the polymer material containing the carbon-carbon double bonds (C=C). The shape of the polymer body is not especially limited. The polymer body can be formed in an approximately columnar shape, an approximately cylindrical shape (such as a belt-like shape), or a planar shape such as a plate-like shape, a sheet-like shape, a film-like shape or a membrane-like shape.

The carbon-carbon double bonds contained in the polymer material constituting the polymer body plays an important role for forming a binding with the N atom present in the isocyanuric acid skeleton and a binding with the C atom present in the organic group having a functional group. Rubbers (including an elastomer, omitted below), resins and mixtures thereof can be used as the polymer contained in the polymer material. Polymers containing the carbon-carbon double bonds and the like can be suitably used as the polymer. Also, polymers of a polymer containing no carbon-carbon double bonds and a component such as a monomer or oligomer containing the carbon-carbon double bond can be used as the polymer contained in the polymer material.

Isoprene rubber (IR), butadiene rubber (BR), acrylonitrile butadiene rubber (NBR), styrene butadiene rubber (SBR), chloroprene rubber (CR), butyl rubber (IIR), ethylene propylene diene rubber (EPDM), natural rubber (NR), styrene-butadiene-styrene block copolymer (SBS) and the like can be exemplified as the polymer containing the carbon-carbon double bonds. One or two or more of these polymers can be contained.

Acrylic rubber (ACM), fluoro-rubber (FKM), hydrin rubber (CO, ECO), silicone rubber (Q), urethane rubber (U), chlorosulfonated polyethylene (CSM), ethylene-vinyl acetate copolymer (EVA), polyethylene resins, epoxy resins, polyamide, silicone resins, urethane resins, acrylic resins and the like can be exemplified as the polymer containing no carbon-carbon double bonds. One or two or more of these polymers can be contained. Butadiene diols, liquid rubbers and the like can be exemplified as the component such as a monomer or oligomer containing the carbon-carbon double bond. One or two or more of these materials can be contained.

The polymer material can contain one or two or more of various additives such as a conducting agent (such as electron conducting agent, ion conducting agent and ion liquid), an inorganic filler, a processing aid, a curing agent, a vulcanization accelerator, a crosslinking agent, a cross-linking aid, an antioxidant, a plasticizer, an ultraviolet absorber, a pigment, an oil, an auxiliary, a surfactant, a bulking agent and a reinforcing agent, according to need.

Here, the modified polymer body has many first binding parts bound to the surface of the polymer body. In the meantime, in the relation with the binding with the first binding parts and the second binding parts, the phrase "surface of the polymer body" means a region where the depth inward from the outermost surface of the polymer body is within 1 μm. The phrase "outermost surface of the polymer body" means the outermost surface of the polymer body. The first binding parts are such that the organic group having the functional group is bound via the isocyanuric acid skeleton to the surface of the polymer body. The isocyanuric acid skeleton binds, at an N atom, to the surface of the polymer body. Specifically, three N atoms are present in the isocyanuric acid skeleton. Therefore, one of these three N atoms may bind to the C atom constituting a carbon-carbon single bond obtained as a result of the change of the carbon-carbon double bond contained in the polymer body, or two N atoms may bind to the C atom constituting a carbon-carbon single bond obtained as a result of the change of the carbon-carbon double bond contained in the polymer body.

A Cl atom, a part of polymerization initiator or the like can bind to the C atom which does not bind with the N atom, between the C atoms constituting a carbon-carbon single bond obtained as a result of the change of the carbon-carbon double bond contained in the polymer body. When an isocyanuric acid skeleton is bound to the surface of the polymer body and a Cl atom is present in the surface of the polymer body, the isocyanuric acid skeleton can be said to be derived from chlorinated isocyanuric acid (trichloroisocyanuric acid and a derivative thereof).

When the isocyanuric acid skeleton binds, at one N atom, to the surface of the polymer body, the organic group having a functional group is bound to at least one of the remaining two N atoms. Also, when the isocyanuric acid skeleton binds, at two N atoms, to the surface of the polymer body, the organic group having a functional group is bound to the remaining one N atom. In the meantime, when two organic groups are bound to one isocyanuric acid skeleton, the two organic groups may be either identical groups or different groups.

The modified polymer body has many second binding parts bound to the surface of the polymer body. The second binding parts are such that an organic group having a functional group is directly bound to the surface of the polymer body without interposing an isocyanuric acid skeleton. That is, the second binding parts are constituted by direct binding of an organic group having a functional group to the C atom constituting a carbon-carbon single bond obtained as a result of the change of the carbon-carbon double bond contained in the polymer body.

In the modified polymer body, the functional group can be one or two or more selected from a silicone group, a fluorine-containing group, an ester group, an amide group, an amino group, an epoxy group, a carbonyl group, a hydroxy group, a carboxylic acid group, a sulfonic acid group, an imide group, an ether group, an aryl group, an azo group, a diazo group, a nitro group, a heterocyclic group, a mesoionic group, a halogen group, an imino group, an alkyl group, an acyl group, a formyl group, a urea group, a urethane group and a cyano group.

In this case, the surface functions due to these functional groups can be imparted to the surface of the polymer body. In the first binding parts and the second binding parts, the organic group having a functional group can have one or two or more of the functional groups. Also, the first binding parts and the second binding parts may be either such that many organic groups having functional groups of the same kind are bound or such that many organic groups having different functional groups are bound. When a plurality of functional groups are present in the surface of the polymer body, a plurality of surface functions can be imparted to the surface of the polymer body.

Among the functional groups, for example, silicone groups and fluorine-containing groups can impart release properties to an adhered substance adhered to the surface of the polymer body (release properties of an adhered substance) and surface functions such as reduction in friction coefficient to the surface of the polymer body. Therefore, release properties to a toner and a toner external additive can be imparted to the surface of a conductive member by using this modified polymer body as a material for a portion including the outermost surface in the conductive member. Also, the tackiness of the surface of the conductive member can also be reduced. Therefore, in this case, the toner is difficult to be fixed onto the surface of the conductive member, so that the toner fixation resistance is excellent. For example, a dimethyl silicone group, a diethyl silicone group and a diphenyl silicone group can be exemplified as the silicone group. For example, a perfluoroalkyl group (preferably, having 1 to 200 carbon atoms), a perfluoroalkyl alkylene oxide group such as a perfluoroalkyl ethylene oxide group, a perfluoroalkenyl group and a fluorine atom (—F) can be exemplified as the fluorine-containing group.

Among the functional groups, for example, an ester group, an amide group and an amino group can impart electric chargeability to the surface of the polymer body. Therefore, toner chargeability to a negatively charged toner can be imparted to the surface of a conductive member by using this modified polymer body as a material for a portion including the outermost surface in the conductive member. Similarly, a fluorine-containing group, a carboxylic acid group and a sulfonic acid group can also impart chargeability to the surface of the polymer body. Therefore, toner chargeability to a positively charged toner can be imparted to the surface of a conductive member by using this modified polymer body as a material for a portion including the outermost surface in the conductive member.

Examples of the conductive member can specifically include a roll-shaped body having an axis body such as a core metal and one or two or more elastic layer(s) formed along the outer circumference of the axis body, and the modified polymer body can be applied as a material for the elastic layer including the outermost surface. Also, examples of the conductive member can include a belt-shaped body having a base layer made of a resin or the like formed in a cylindrical shape and an elastic layer formed along the outer circumferential surface of this base layer, and the modified polymer body can be applied as a material for this elastic layer.

Also, among the functional groups, an epoxy group, a carbonyl group and a hydroxy group can impart, for example, wettability and adhesion properties to the surface of the polymer body. Among the functional groups, a carboxylic acid group and a sulfonic acid group can impart ion exchanging function to the surface of the polymer body. In the meantime, examples of the heterocyclic group can include a pyridyl group, an imidazole group and oxazole group. Examples of the mesoionic group can include a sydnone group and a munchnone group.

In the modified polymer body, the organic group having the functional group can be a group derived from an organic compound having the functional group and the carbon-carbon double bond.

In this case, first binding parts having a chemical structure in which one or two N atom(s) not involved in the binding with the polymer body surface among the N atoms in the isocyanuric acid skeleton and the one C atom constituting a carbon-carbon single bond obtained as a result of the change of the carbon-carbon double bond contained in the organic compound are bound can be arranged on the surface of the polymer body. Also, in this case, second binding parts having a chemical structure in which the one C atom constituting a carbon-carbon single bond obtained as a result of the change of the carbon-carbon double bond contained in the polymer body and the one C atom constituting a carbon-carbon single bond obtained as a result of the change of the carbon-carbon double bond contained in the organic compound are bound can be arranged on the surface of the polymer body.

Therefore, in this case, the binding between the surface of the polymer body and the first binding parts and the surface of the polymer body and the second binding parts can be ensured.

In the organic compound, the functional group may be either directly bound to the C atom in the carbon-carbon double bond, or indirectly bound to the C atom via any other structural site such as a carbon chain.

Suitable examples of the organic compound referred to in the "group derived from the organic compound" can include those represented by Formulae 1 to 16 indicated below and those including sites that the organic compounds are chained. One or two or more of these can be used in combination. A Cl atom of the (A) component contained in the surface treatment liquid, a part of the polymerization initiator as the (C) component and the like may be bound into the organic group having the functional group.

[Chemical Formula 1]

(Formula 1)

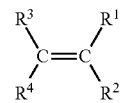

In Formula 1, $R^1$ is $-X^2-X^1$ or $-X^1$. $X^1$ is the above-described functional group such as a silicone group or a fluorine-containing group. $X^2$ is any of an ester group ($-C(O)O-$), an ether group ($-O-$), a carbonyl group ($-CO-$), a urethane group ($-NH-C(O)O-$) and an amide group ($-NH-CO-$), and is preferably an ester group. $R^2$ to $R^4$ may be hydrogen atoms or alkyl groups, and may be either groups identical with $R^1$ or groups having a functional group different from that of $R^1$. $R^2$ to $R^4$ are preferably hydrogen atoms or alkyl groups, more preferably hydrogen atoms from the viewpoint of stability and the like. $R^2$ to $R^4$ may be groups different from each other, or a part or all of $R^2$ to $R^4$ may be identical with each other.

[Chemical Formula 2]

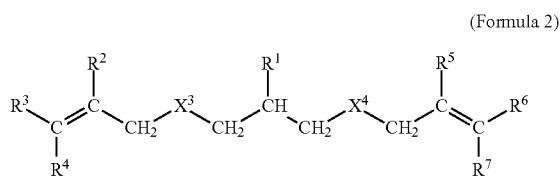

(Formula 2)

In Formula 2, $R^1$ is $-X^2-X^1$ or $-X^1$. $X^1$ is the above-described functional group such as a silicone group or fluorine-containing group. $X^2$ is any of an ester group, an ether group, a carbonyl group, a urethane group and an amide group, and is preferably an ester group. $R^2$ to $R^7$ may be hydrogen atoms or alkyl groups, and may be either groups identical with $R^1$ or groups having a functional group different from that of $R^1$. $R^2$ to $R^7$ are preferably hydrogen atoms or alkyl groups, more preferably hydrogen atoms from the viewpoint of stability and the like. $R^2$ to $R^7$ may be groups different from each other, or a part or all of $R^2$ to $R^7$ may be identical with each other. $X^3$ and $X^4$ are any of ester groups, ether groups, carbonyl groups, urethane groups and amide groups, and are preferably ester groups. $X^3$ and $X^4$ may have mutually different structures, or the same structure.

[Chemical Formula 3]

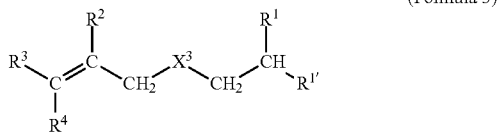

(Formula 3)

In Formula 3, $R^1$ and $R^{1'}$ are $-X^2-X^1$ or $-X^1$ is the above-described functional group such as a silicone group or fluorine-containing group. $X^2$ is any of an ester group, an ether group, a carbonyl group, a urethane group and an amide group, and is preferably an ester group. $R^2$ to $R^4$ may be hydrogen atoms or alkyl groups, and may be either groups identical with $R^1$ or groups having a functional group different from that of $R^1$. $R^2$ to $R^4$ are preferably hydrogen atoms or alkyl groups, more preferably hydrogen atoms from the viewpoint of stability and the like. $R^2$ to $R^4$ may be groups different from each other, or a part or all of $R^2$ to $R^4$ may be identical with each other. $X^3$ is any of an ester group, an ether group, a carbonyl group, a urethane group and an amide group, and is preferably an ester group.

[Chemical Formula 4]

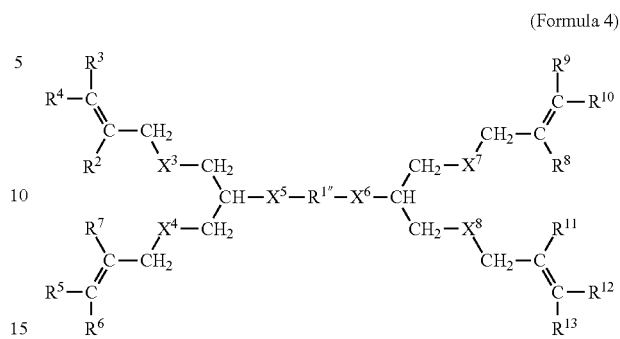

(Formula 4)

In Formula 4, $R^{1''}$ is $-X^2-X^1-X^2-$ or $-X^1-$. $X^1$ is the above-described functional group such as a silicone group or fluorine-containing group. $X^2$ is any of an ester group, an ether group, a carbonyl group, a urethane group and an amide group, and is preferably an ester group. $R^2$ to $R^{13}$ may be hydrogen atoms or alkyl groups. $R^2$ to $R^{13}$ are preferably hydrogen atoms or alkyl groups, more preferably hydrogen atoms from the viewpoint of stability and the like. $R^2$ to $R^{13}$ may be groups different from each other, or a part or all of $R^2$ to $R^{13}$ may be identical with each other. $X^3$ to $X^8$ are any of ester groups, ether groups, carbonyl groups, urethane groups and amide groups, and are preferably ester groups. $X^3$ to $X^8$ may have mutually different structures, or a part or all of $X^3$ to $X^8$ may have the same structure.

When a silicone group or fluorine-containing group is selected as the functional group in the organic compound represented by Formula 1 indicated above, those represented by Formulae 5 to 7 indicated below can be exemplified as especially suitable ones from the viewpoint of stability and the like.

[Chemical Formula 5]

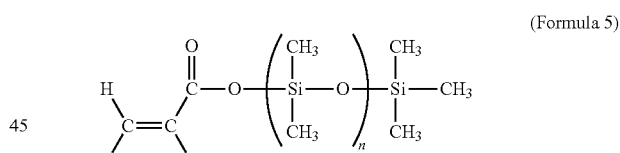

(Formula 5)

[Chemical Formula 6]

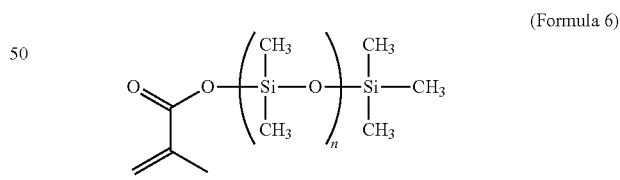

(Formula 6)

[Chemical Formula 7]

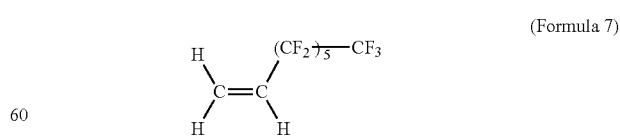

(Formula 7)

In Formulae 5 and 6, n is a positive integer.

Also, in addition to those represented by Formulae 5 to 7, those represented by Formulae 8 to 12 indicated below can be exemplified as specific examples of the organic compound represented by Formula 1 indicated above.

[Chemical Formula 8]

(Formula 8)

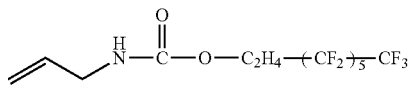

[Chemical Formula 9]

(Formula 9)

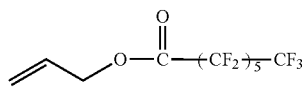

[Chemical Formula 10]

(Formula 10)

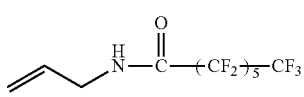

[Chemical Formula 11]

(Formula 11)

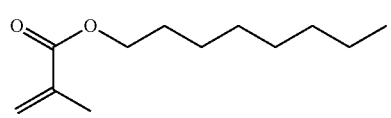

[Chemical Formula 12]

(Formula 12)

When a silicone group or fluorine-containing group is selected as the functional group in the organic compounds represented by Formulae 2 to 4 indicated above, those represented by Formulae 13 to 16 indicated below can be exemplified as especially suitable ones from the viewpoint of stability and the like.

[Chemical Formula 13]

(Formula 13)

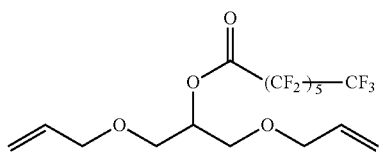

[Chemical Formula 14]

(Formula 14)

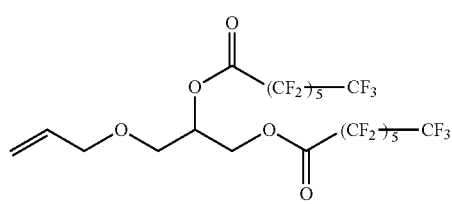

[Chemical Formula 15]

(Formula 15)

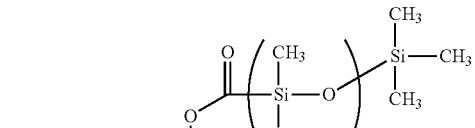

[Chemical Formula 16]

(Formula 16)

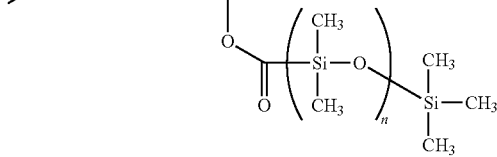

In Formulae 15 and 16, n is a positive integer.

A surface configuration of the modified polymer body can be detected, for example, by IR, XPS, NMR, pyrolysis gas chromatographic mass spectrometry or the like. Specifically, the kind, amount and the like of the functional group can be analyzed by identifying the kind of the functional group by IR, and thereafter detecting an atom specific to the functional group in the surface of the modified polymer body by XPS. The atom specific to the functional group includes, specifically, a Si atom for the silicone group, an F atom for the fluorine-containing group, an O atom for the ester group, N and O atoms for the amide group, an N atom for the amino group, an O atom for the epoxy group, an O atom for the carbonyl group, an O atoms for the hydroxy group, an O atom for the carboxylic acid group, S and O atoms for the sulfonic acid group, N and O atoms for the imide group, an O atom for the ether group, a C atom for the aryl group, an N atom for the azo group, an N atom for the diazo group, N and O atoms for the nitro group, an N, O or S atom for the heterocyclic group, an N atom for the mesoionic group, an F, Cl, Br or I atom for the halogen group, an N atom for the imino group, a C atom for the alkyl group, an O atom for the acyl group, an O atom for the formyl group, an N atom for the urea group, N and O atoms for the urethane group, and an N atom for the cyano group. Also, the presence or absence of an isocyanuric acid skeleton, its binding position, amount and the like, and the presence or absence of an atom specific to the functional group, its binding position, amount and the like can be obtained by scraping off the surface of the modified polymer body, subjecting it to chemical decomposition treatment according to need, and analyzing it by $^{13}$C-NMR or $^1$H-NMR. The structure of the functional group can be obtained by further scraping off the surface of the modified polymer body and subjecting it to pyrolysis gas chromatographic mass spectrometry, according to need. Also, the difference between the first binding parts and the second binding parts can be detected based, for example, on the difference in chemical shift of $^{13}$C-NMR between the carbon of the organic group in the first binding parts involved in the binding with an isocyanuric acid skeleton and the carbon of the organic group in the second binding parts involved in the binding with the polymer body surface without interposing an isocyanuric acid skeleton. Also, the chlorine derived from the (A) component can be detected even when the depth inward from the outermost surface of the polymer body is within 1 µm or about several micrometers. On the other hand, the component derived from the (B) can be detected mainly when the depth inward from the outermost surface of the polymer body is within 1 µm. In the meantime, the kind of the surface treatment liquid which is used in the formation of a modified polymer body, procedures for surface treatment and the like can also be taken into consideration for identifying the surface configuration.

In the modified polymer body, a concentration distribution of an atom specific to the functional group over the depth direction from the outermost surface of the polymer body is preferably such that the concentration of the atom (atom %) specific to the functional group is maximum at the outermost surface of the polymer body. When a plurality of functional groups are contained in the surface of the polymer body, the concentration distribution of at least an atom specific to the functional group contained in the largest amount, among these functional groups, is sufficient if the concentration of this atom is maximum at the outermost surface of the polymer body. Also, when there are a plurality of atoms specific to the functional group, the concentration distribution of at least any one of the atoms, among these specific atoms, is sufficient if the concentration of this atom is maximum at the outermost surface of the polymer body.

In this case, the surface function due to the functional group is effectively and easily exerted. The concentration distribution of the atom specific to the functional group specifically can include a portion in which the concentration of the atom specific to the functional group gradually reduces (reduces gradiently) as the depth from the outermost surface of the polymer body is deeper. In the meantime, the maximum value of the concentration of the atom specific to the functional group may be present within a range where the depth from the outermost surface of the polymer body is up to about 5 nm.

In the modified polymer body, when a chlorine atom exists in the surface of the polymer body, a concentration distribution of the chlorine atom over the depth direction from the outermost surface of the polymer body is preferably such that the concentration of the chlorine atom (atom %) is maximum in a position deeper than the outermost surface of the polymer body. This case is advantageous in developing the surface function over a long term. Specifically, the depth at which the concentration of the chlorine atom is maximum is desirably located in a position deeper than the depth at which the concentration of the atom specific to the functional group is maximum, in an element concentration distribution over the depth direction from the outermost surface of the polymer body. Also, the concentration distribution of the chlorine atom specifically can include a portion in which the concentration of the chlorine atom gradually increases, becomes maximum and thereafter gradually reduces as the depth from the outermost surface of the polymer body is increased. In the meantime, the maximum value of the concentration of the chlorine atom desirably falls within a range of from about 1 atom % to about 10 atom %, preferably from about 2 atom % to about 5 atom % from the viewpoint of easiness to develop the surface function over a long term.

Next, a surface treatment liquid is explained. The surface treatment liquid is prepared by mixing at least (A) a chlorinated isocyanuric acid and/or a derivative thereof, (B) an organic compound having a functional group and a carbon-carbon double bond, (C) a polymerization initiator and (D) a solvent as described above. Therefore, the surface treatment liquid is suitable for the formation of the modified polymer body.

In the surface treatment liquid, the functional group can be one or two or more selected from a silicone group, a fluorine-containing group, an ester group, an amide group, an amino group, an epoxy group, a carbonyl group, a hydroxy group, a carboxylic acid group, a sulfonic acid group, an imide group, an ether group, an aryl group, an azo group, a diazo group, a nitro group, a heterocyclic group, a mesoionic group, a halogen group, an imino group, an alkyl group, an acyl group, a formyl group, a urea group, a urethane group and a cyano group.

In this case, these functional groups can be suitably used in order to impart the surface functions due to these functional groups to the surface of the polymer body. The explanation about the functional groups is omitted as conforming to the explanation about the modified polymer body.

For example, trichloroisocyanuric acid, dichloroisocyanuric acid alkali metal salts such as sodium dichloroisocyanurate and potassium dichloroisocyanurate, and hydrates thereof can be exemplified as the (A) chlorinated isocyanuric acid and/or derivative thereof. These materials can be used singly or as a combination of two or more thereof. Among these materials, trichloroisocyanuric acid is preferably suitable as the (A) from the viewpoints of the reactivity with the (B) component, availability and the like.

The explanation about the modified polymer body can be applied mutatis mutandis for the (B) organic compound having a functional group and a carbon-carbon double bond.

A radical polymerization initiator, a cationic polymerization initiator, an anionic polymerization initiator and the like can be exemplified as the (C) polymerization initiator. The radical polymerization initiator, cationic polymerization initiator and anionic polymerization initiator may be those which produce radicals, cations and anions, respectively, upon irradiation with light such as ultraviolet rays or electron beams, or may be those which produce radicals, cations and anions, respectively, by heat or the like.

Among these materials, a radical photopolymerization initiator which produces radicals upon irradiation with light such as ultraviolet rays or electron beams, a cationic photopolymerization initiator which produces cations upon irradiation with light such as ultraviolet rays or electron beams, and an anionic photopolymerization initiator which produces anions upon irradiation with light such as ultraviolet rays or electron beams can be suitably used as the (C) polymerization initiator. Above all, the radical photopolymerization initiator can be especially suitably used. This is because the radical photopolymerization initiator, when used in the formation of the modified polymer body, relatively easily causes a reaction of the organic compound adhered as an unreacted component onto the surface of the polymer body, thereby facilitating direct binding of the organic compound as an organic group to the surface of the polymer body.

Specific examples of the radical photopolymerization initiator can include acetophenone, p-anisyl, benzyl, benzoin, benzoin ethyl ether, benzoin isobutyl ether, benzoin isopropyl ether, benzoin methyl ether, benzophenone, 2-benzoyl benzoic acid, 4-benzoyl benzoic acid, 4,4'-bis(diethylamino)benzophenone, 4,4'-bis(dimethylamino)benzophenone, 4,4'-dichlorobenzophenone, 2,2-diethoxyacetophenone, 2,4-diethylthioxaneten-9-one, 2,2-dimethoxy-2-phenylacetophenone, diphenyl(2,4,6-trimethylbenzoyl)phosphine oxide, 2-ethylanthraquinone, 1-hydroxycyclohexyl phenyl ketone, 2-hydroxy-2-methyl-propiophenone, 2-isonitrosopropiophenone, methyl 2-benzoyl benzoate, 2-methyl-4'-(methylthio)-2-morphorinopropiophenone and 2-phenyl-2-(p-toluenesulfonyloxy)acetophenone. These materials can be used singly or as a combination of two or more thereof.

Specific examples of the cationic photopolymerization initiator can include bis(4-tert-butylphenyl)iodonium hexfluorophosphate, bis(4-tert-butylphenyl)iodonium trifluoromethanesulfonate, 2-(3,4-dimethoxystyryl)-4,6-bis(trichloromethyl)-1,3,5-triazine, diphenyliodonium hexafluoroarsenate, diphenyliodonium hexafluorophosphate, diphenyliodonium trifluoromethane sulfonic acid, 2-[2-(furan-2-yl)vinyl]-4,6-bis(trichloromethyl)-1,3,5-triazine, 4-isopropyl-4'-methyldiphenyliodonium tetrakis(pentafluorophenyl)borate, 2-(4-methoxyphenyl)-4,6-bis(trichloromethyl)-1,3,5-triazine, 2-[2-(5-methylfuran-2-yl)vinyl]-4,6-bis(trichloromethyl)-1,3,5-triazine, triphenylsulfonium tetrafluoroborate, tri-p-tolylsulfonium hexfluorophosphate and tri-p-tolylsulfonium trifluoromethanesulfonate. These materials can be used singly or as a combination of two or more thereof.

Specifically, nifedipine and the like can be exemplified as the anionic photopolymerization initiator.

The (D) component is mainly intended to dissolve or disperse the (A) to (C) components to prepare a product in a liquid form. Examples of the (D) component can include organic solvents such as ether solvents (such as THF, diethyl ether and dioxane), ester solvents (such as ethyl acetate and butyl acetate), ketone solvents (such as acetone and MEK), amide solvents (such as DMF, DAC and NMP), tertiary alcohols (such as tert-butyl alcohol) and hydrocarbon solvents (such as toluene, xylene and hexane), and water. These materials can be used singly or as a combination of two or more thereof.

The surface treatment liquid can be prepared, for example, by mixing the respective components at a temperature ranging from about 0° C. to about 50° C.

The formulation of the surface treatment liquid can be defined, for example, as including the components in the following proportions based on 100 parts by mass of the (D) component solvent from the viewpoints of, for example, improving reactivity and suppressing uneven surface treatment. Namely, when the (B) component is an organic compound having, for example, a silicone group and a carbon-carbon double bond, the proportion of the (A) component can be defined as 2 to 10 parts by mass, preferably 3 to 7 parts by mass; the proportion of the (B) component can be defined as 0.01 to 5 parts by mass, preferably 0.02 to 2 parts by mass; and the proportion of the (C) component can be defined as 0.1 to 5 parts by mass, preferably 0.2 to 2 parts by mass. Also, when the (B) component is an organic compound having, for example, a fluorine-containing group and a carbon-carbon double bond, the proportion of the (A) component can be defined as 2 to 10 parts by mass, preferably 3 to 7 parts by mass; the proportion of the (B) component can be defined as 0.01 to 5 parts by mass, preferably 0.02 to 2 parts by mass; and the proportion of the (C) component can be defined as 0.1 to 5 parts by mass, preferably 0.2 to 2 parts by mass.

The surface treatment liquid can contain one or two or more of acids, bases, catalysts such as metal salts, and additives such as surfactants according to need, in addition to the respective components. Also, the surface treatment liquid can contain one or two or more of UV-curable acryl monomers, UV-curable acryl silicone copolymers and the like in addition to the respective components, and such a material/materials may be reacted with the double bond of rubber.

In the surface treatment liquid, a chemical reaction takes place between the (A) component and the (B) component. Specifically, in the surface treatment liquid, the N atom in the (A) component and the one C atom constituting a carbon-carbon single bond obtained as a result of the change of the carbon-carbon double bond in the (B) component bind together to produce a new compound. For example, when trichloroisocyanuric acid and an organic compound represented by Formula 1 are used as the (A) component and the (B) component, respectively, a compound (3) is produced by a reaction represented by Formula 17. Also, the compound (3) produced by the reaction represented by Formula 17 has an N—Cl bond which additionally reacts with the carbon-carbon double bond contained in the organic compound of the (A) component. Therefore, a compound represented by Formula 18 can be further produced depending on conditions such as the proportions of the (A) component and the (B) component.

[Chemical Formula 17]

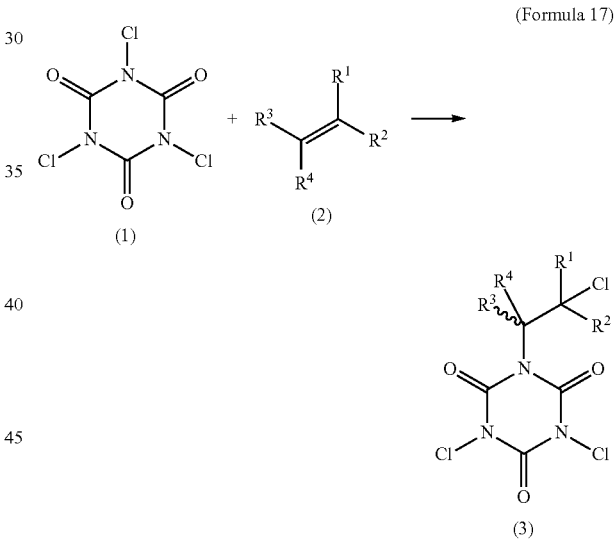

[Chemical Formula 18]

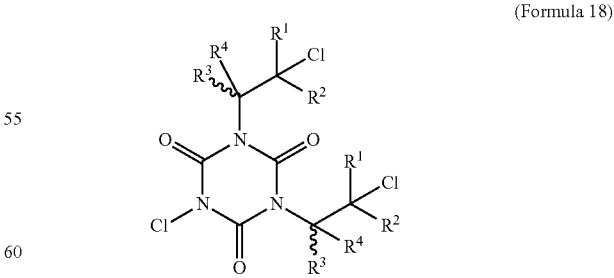

However, it has been newly revealed that the reaction between the (A) component and the (B) component as described above does not completely progress and that, in fact, the (B) component remains as an unreacted component in the surface treatment liquid. Thus, the (A) component, (B)

component, one or two or more reaction product(s) produced by the reaction between the (A) component and the (B) component, (C) component and (D) component can be contained in the surface treatment liquid prepared by mixing the respective components.

Next, a process for forming a modified polymer body used in the conductive member is explained.

The process for forming the modified polymer body includes a contacting step of bringing a surface treatment liquid, which is prepared by mixing at least (A) a chlorinated isocyanuric acid and/or a derivative thereof, (B) an organic compound having a functional group and a carbon-carbon double bond, (C) a polymerization initiator, and (D) a solvent, into contact with the outermost surface of a polymer body composed of a polymer material having carbon-carbon double bonds and an energy applying step of applying energy to the outermost surface of the polymer body after being subjected to the contacting step.

According to the process for forming the modified polymer body, the organic group having the functional group is bound via the isocyanuric acid skeleton to the surface of the polymer body composed of the polymer material having the carbon-carbon double bonds via the contacting step of bringing the polymer body into contact with the surface treatment liquid, thereby forming the first binding parts. Also, the organic compound having the functional group and the carbon-carbon double bond as an unreacted component and the polymerization initiator are adhered onto the outermost surface of the polymer body.

Next, the energy applying step causes a polymerization reaction, so that the organic group having the functional group is directly bound to the surface of the polymer body without interposing the isocyanuric acid skeleton, thereby forming the second binding parts. Therefore, the process for forming the modified polymer body can suitably provide the modified polymer body.

For the specific polymer body and surface treatment liquid in the contacting step, the explanations about the modified polymer body and surface treatment liquid as described above are applied mutatis mutandis. The method of bringing the surface treatment liquid into contact with the outermost surface of the polymer body in the contacting step is not especially limited, and can be determined in view of the shape of the polymer body, productivity and the like. Specifically, examples of the method can include a method of immersing the polymer body in the surface treatment liquid, and a method of coating or spraying the surface treatment liquid onto the outermost surface of the polymer body.

The temperature of the surface treatment liquid can be defined as preferably about 20° C. to about 100° C., more preferably about 25° C. to about 70° C. from the viewpoints of, for example, improving reactivity and suppressing uneven surface treatment, but is sufficiently about the normal temperature. The time of contact between the polymer body and the surface treatment liquid can be defined as preferably about 10 seconds to about 1 hour, more preferably about 30 seconds to about 5 minutes from the viewpoints of obtaining sufficient surface modifying effect, productivity and the like.

Also, in the energy applying step, energy is applied to the outermost surface of the polymer body after being subjected to the contacting step. The application of energy can be carried out by irradiating the outermost surface of the polymer body with light energy from ultraviolet rays, electron beams and the like or heating the surface of the polymer body, depending, for example, on the kind of the (C) polymerization initiator contained in the surface treatment liquid used.

The application of the energy is preferably light irradiation.

In this case, the organic compound as an unreacted component adhered onto the outermost surface of the polymer body can be relatively easily reacted to be directly bound as an organic group to the surface of the polymer body. Therefore, the productivity of the modified polymer body is excellent. At this time, ultraviolet irradiation can be suitably used as the light irradiation, for example, from the viewpoint of the advantage that the effect can be obtained by using a relatively simple device.

The forming process can have a cleaning step of cleaning the outermost surface of the polymer body after being subjected to the contacting step between the contacting step and the energy applying step, according to need. In this case, an unnecessary component can be washed away, so that treatment unevenness can be reduced. In the meantime, water, an organic solvent, a mixed solution thereof and the like can be used for cleaning.

Since the (B) component organic compound as an unreacted component and (C) component polymerization initiator are adsorbed onto the outermost surface of the polymer body, not all the components are removed from the outermost surface of the polymer body by the cleaning.

EXAMPLE

A conductive member for an electrophotographic image forming apparatus according to an Example is specifically explained by use of the drawings.

The conductive member for an electrophotographic image forming apparatus according to the Example uses a modified polymer body as a material for a portion including the outermost surface in the conductive member. As shown in FIG. 1, a modified polymer body 1 has a polymer body 2 composed of a polymer material containing carbon-carbon double bonds and first binding parts 3 and second binding parts 4 bound to the surface of the polymer body 2. The first binding parts 3 are such that an organic group 6 having a functional group is bound via an isocyanuric acid skeleton 5 to the surface of the polymer body 2. Also, the second binding parts 4 are such that an organic group 7 having a functional group is directly bound to the surface of the polymer body 2 without interposing the isocyanuric acid skeleton 5.

In this Example, the organic group 6 having a functional group in the first binding parts 3 is a group derived from the organic compound represented by Formula 1. However, a Cl atom is bound to the C atom which does not bind with a N atom in the isocyanuric acid skeleton 5, between the C atoms constituting a carbon-carbon single bond obtained as a result of the change of the carbon-carbon double bond contained in the organic compound represented by Formula 1.

The organic group 7 having a functional group in the second binding parts 4 is a group derived from the organic compound represented by Formula 1. However, a part of a polymerization initiator represented by Formula 19 (a portion other than the tert-butyl group) is bound to the C atom which does not bind with the C atom constituting a carbon-carbon single bond obtained as a result of the change of the carbon-carbon double bond contained in the polymer body 2, between the C atoms constituting a carbon-carbon single bond obtained as a result of the change of the carbon-carbon double bond contained in the organic compound represented by Formula 1. In the meantime, the remaining portion of the polymerization initiator (tert-butyl group) binds to the C atom in the skeleton of the polymer body.

[Chemical Formula 19]

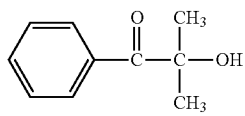

(Formula 19)

Figure 2:
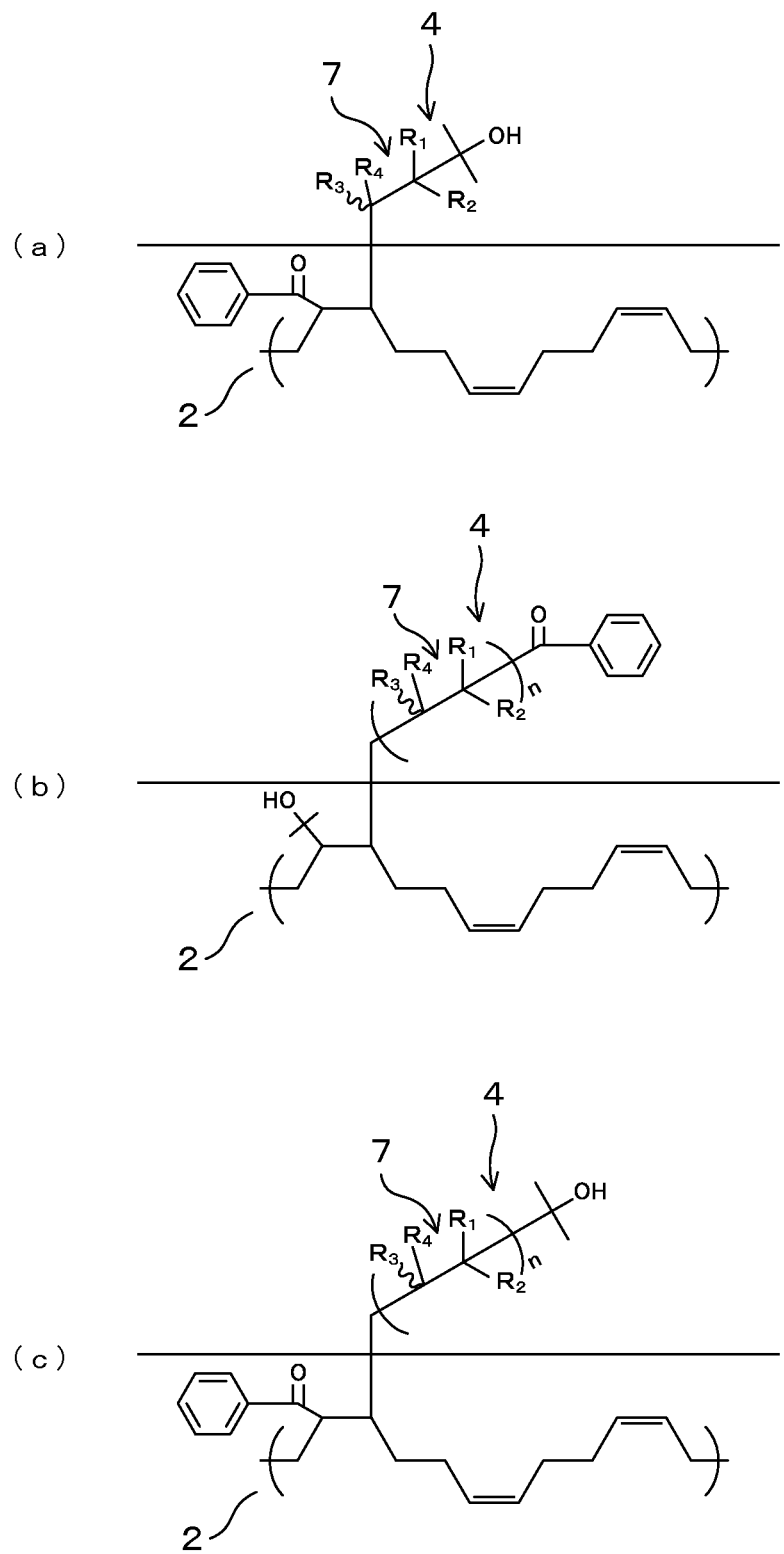
FIG. 2 is a view schematically showing another example of second binding parts.

The organic group 7 having a functional group in the second binding parts 4 may have such a structure that a part of the polymerization initiator represented by Formula 19 (tert-butyl group) is bound to the C atom which does not bind with the C atom constituting a carbon-carbon single bond obtained as a result of the change of the carbon-carbon double bond contained in the polymer body 2, between the C atoms constituting a carbon-carbon single bond obtained as a result of the change of the carbon-carbon double bond contained in the organic compound represented by Formula 1, as shown in FIG. 2(a). In this case, the remaining part of the polymerization initiator (a portion other than the tert-butyl group) can bind to the C atom in the skeleton of the polymer body. Also, as shown in FIGS. 2(b) and 2(c), the organic group 7 having a functional group in the second binding parts 4 can contain a chemical structure having chained organic compounds represented by Formula 1 (in the figures, n is a positive integer).

Figure 3:
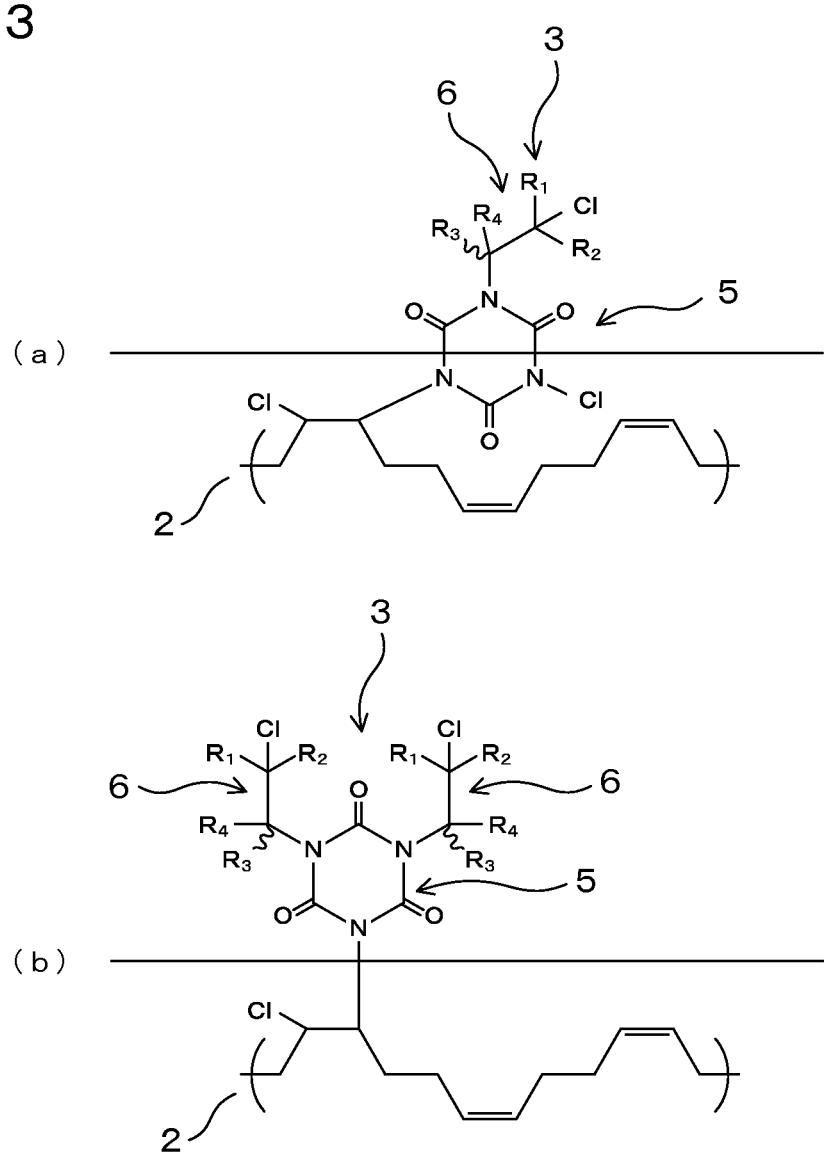
FIG. 3 is a view schematically showing another binding example between the surface of the polymer body and first binding parts.

Also, FIG. 1, as described above, illustrates a configuration in which the isocyanuric acid skeleton 5 binds, at two N atoms, to the surface of the polymer body 2 and one organic group 6 binds to one isocyanuric acid skeleton 5. FIG. 3 schematically shows another binding example between the surface of the polymer body and the first binding parts. FIG. 3(a) shows a configuration in which the isocyanuric acid skeleton 5 binds, at one N atom, to the surface of the polymer body 2 and one organic group 6 binds to one isocyanuric acid skeleton 5. FIG. 3(b) shows a configuration in which the isocyanuric acid skeleton 5 binds, at one N atom, to the surface of the polymer body 2 and two organic groups 6 bind to one isocyanuric acid skeleton 5. The modified polymer body 1 may be such that the isocyanuric acid skeleton 5 binds to the surface of the polymer body 2 in any of manners shown in FIGS. 1, 3(a) and 3(b), and may include a combination of these bindings. The organic group 6 having a functional group in the first binding parts 3 can include a chemical structure including chained organic compounds of Formula 1 (in the figure, n is a positive integer), though not shown.

The modified polymer body 1 may have such a structure that an isocyanuric acid skeleton to which an organic group having a functional group does not bind, a hydrolysate thereof or the like is bound to the surface of the polymer body 2, within a scope in which the surface function would not be adversely affected. FIG. 1 illustrates a structure 8 wherein trichloroisocyanuric acid as the (A) component contained in the surface treatment liquid binds to the surface of the polymer body 2 and the N—Cl bond has been changed by hydrolysis into an N—H bond and also a structure 9 wherein Cl in the N—Cl bond and the OH group produced by hydrolysis respectively bind to the C atom constituting a carbon-carbon single bond obtained as a result of the change of the carbon-carbon double bond contained in the polymer body 2.

Next, samples of the modified polymer body applied to a conductive roll and a conductive belt to be incorporated in an image forming device employing an electrophotographic system were prepared and evaluated. Hereinafter, an experimental example is explained.

Figure 4:
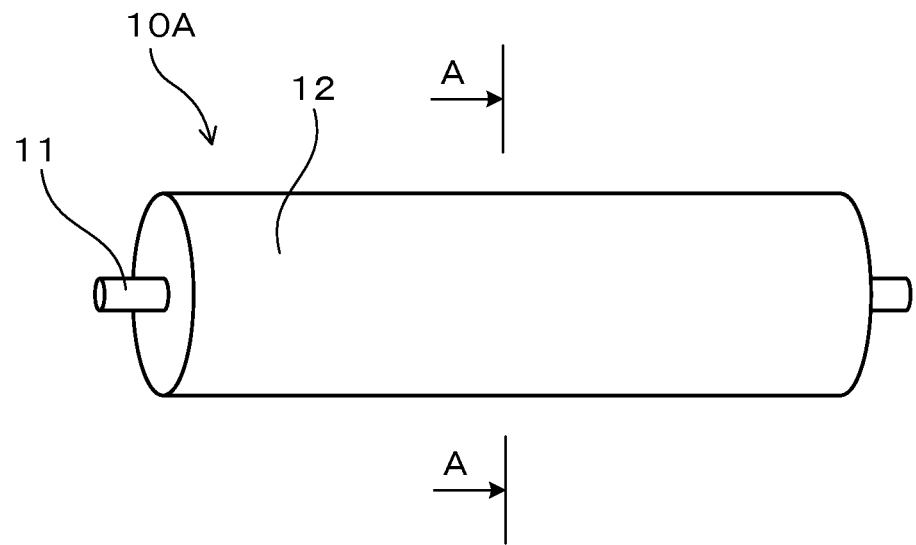
FIG. 4 is a view schematically showing a conductive roll having a single-layer structure prepared as a sample.
Figure 5:
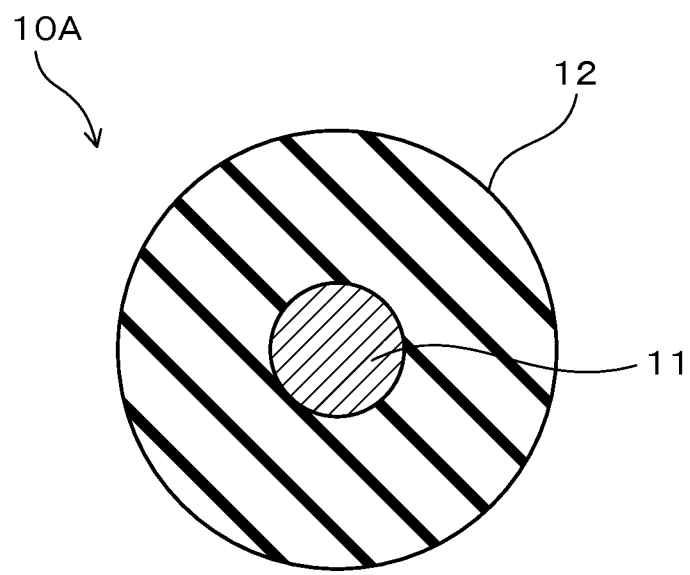
FIG. 5 is a view schematically showing the A-A cross section in FIG. 4.
Figure 6:
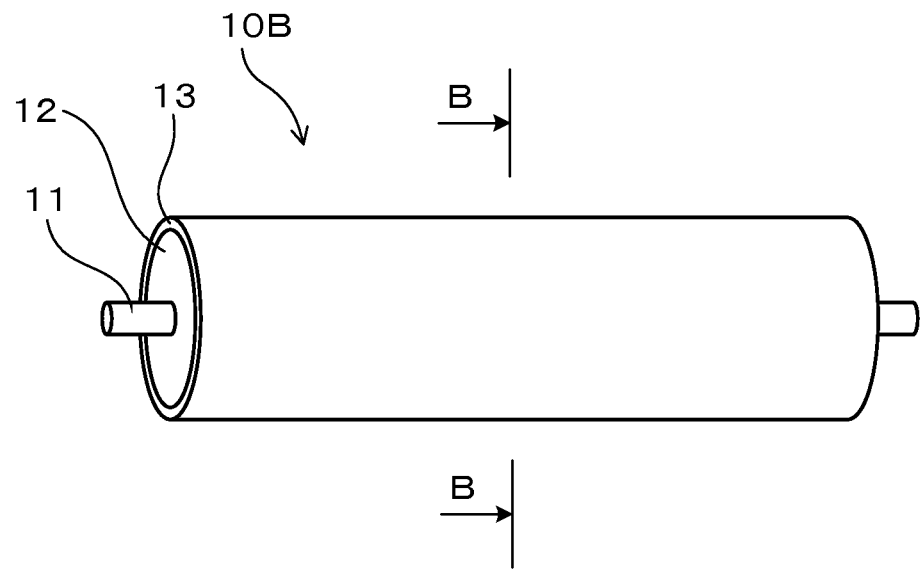
FIG. 6 is a view schematically showing a conductive roll having a dual-layer structure prepared as a sample.
Figure 7:
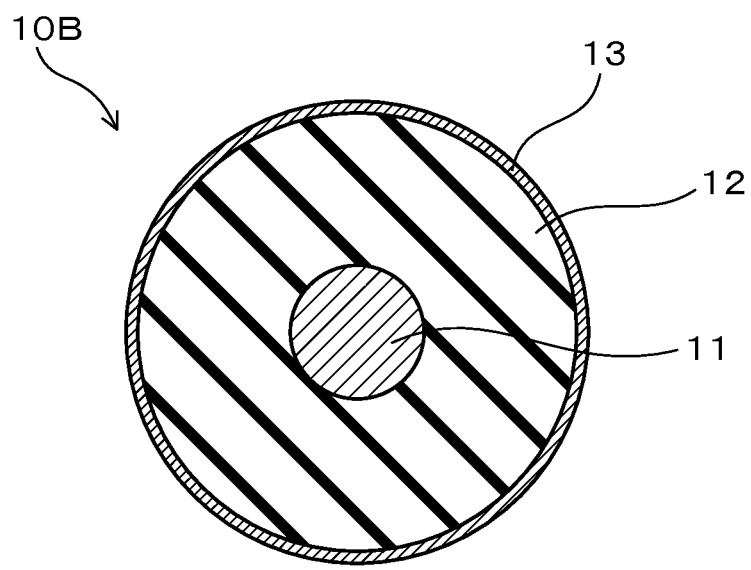
FIG. 7 is a view schematically showing the B-B cross section in FIG. 6.
Figure 8:
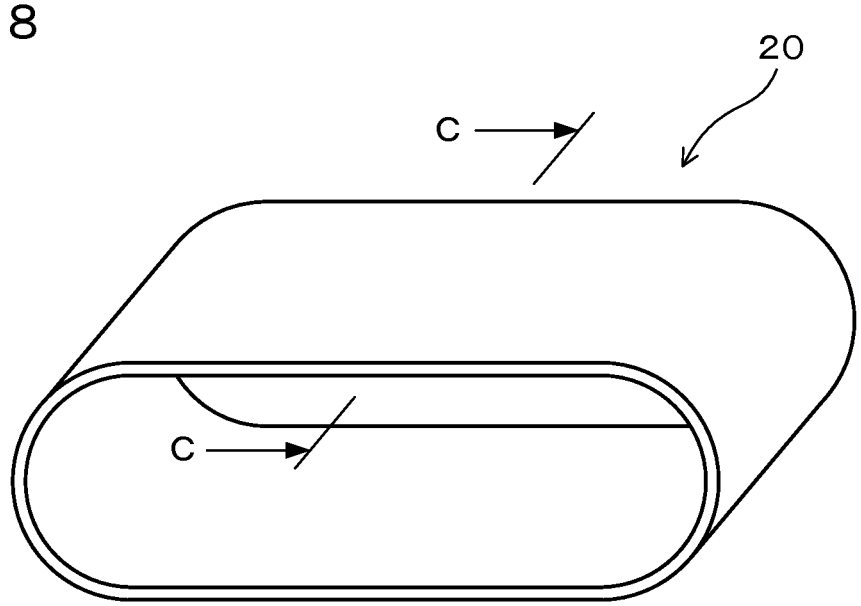
FIG. 8 is a view schematically showing a conductive belt having a dual-layer structure prepared as a sample.
Figure 9:
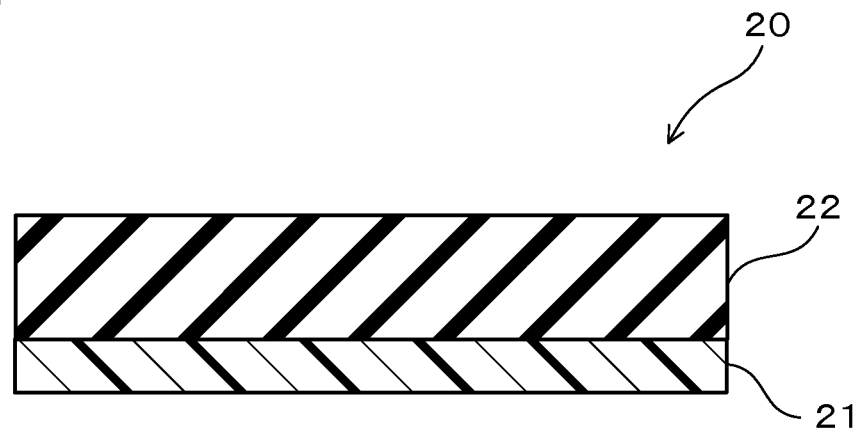
FIG. 9 is a view schematically showing the C-C cross section in FIG. 8.

In this experimental example, the modified polymer body was applied to an elastic layer 12 in a conductive roll 10A having an axis body 11 and the elastic layer 12 formed along the outer circumference of the axis body 11 wherein the surface of the elastic layer 12 was exposed as shown in FIGS. 4 and 5. Also, the modified polymer body was applied to a surface layer 13 in a conductive roll 10B having an axis body 11, an elastic layer 12 formed along the outer circumference of the axis body 11 and the surface layer 13 formed on the outer circumference of the elastic layer 12 wherein the surface of the surface layer 13 was exposed as shown in FIGS. 6 and 7. Further, the modified polymer body was applied to an elastic layer 22 in a conductive belt 20 having a cylindrically-formed base layer 21 and an elastic layer 22 formed along the outer circumferential surface of the base layer 21 wherein the surface of the elastic layer 22 was exposed as shown in FIGS. 8 and 9.

(Experimental Example)
<Preparation of Surface Treatment Liquid>
The following materials were provided as materials for a surface treatment liquid.
(A) Component
Trichloroisocyanuric acid [manufactured by Tokyo Chemical Industry Co., Ltd.]
(B) Component
Silicone oil [manufactured by Shin-Etsu Chemical Co., Ltd., "X-22-174DX"]
(organic compound having the chemical structure shown by Formula 5 as described above and having a weight average molecular weight corresponding to about 4000, and containing a silicone group and a C=C bond)
Methyl methacrylate (containing an ester group and a C=C bond)
'N'N-dimethylacrylamide (containing an amide group and a C=C bond)
(C) Component
Radical photopolymerization initiator (2-hydroxy-2-methyl-1-phenylpropan-1-one) [manufactured by Ciba Specialty Chemicals Inc., "DAROCUR 1173"]
(D) Component
Tert-butyl alcohol
Ethyl acetate The respective provided materials for the surface treatment liquid as described above were weighed into the blending proportions (parts by mass) indicated in Table 1. The respective weighed materials were mixed at room temperature for 10 minutes by means of an air stirrer to prepare surface treatment liquids C1 to C3, D1 to D3 and A1.

TABLE 1

| | Type of surface treatment liquid | | | | | | |
|---|---|---|---|---|---|---|---|
| | C1 | C2 | C3 | D1 | D2 | D3 | A1 |
| (A) Component | | | | | | | |
| Trichloroisocyanuric acid | 5 | 5 | 5 | — | 5 | — | 5 |
| (B) Component | | | | | | | |
| Silicone oil (containing silicone group and C=C) | 1 | 0.2 | 0.2 | 1 | — | — | 1 |

TABLE 1-continued

| | Type of surface treatment liquid | | | | | | |
|---|---|---|---|---|---|---|---|
| | C1 | C2 | C3 | D1 | D2 | D3 | A1 |
| Methyl methacrylate (containing ester group and C=C) | — | 2.5 | — | — | — | — | — |
| 'N'N-dimethylacrylamide (containing amide group and C=C) | — | — | 2.5 | — | — | — | — |
| (C) Component | | | | | | | |
| 2-hydroxy-2-methyl-1-phenylpropan-1-one (D) Component | 0.3 | 0.3 | 0.3 | 0.3 | 0.3 | 0.3 | — |
| Tert-butyl alcohol | 80 | 80 | 80 | 80 | 80 | 80 | 80 |
| Ethyl acetate | 20 | 20 | 20 | 20 | 20 | 20 | 20 |

<Preparation of Conductive Roll as Material to be Treated>

Two types of conductive rolls as materials to be treated, to which treatment with a surface treatment liquid was to be subjected, were prepared as follows.

A composition for forming an elastic layer was prepared by kneading 100 parts by mass of NBR [manufactured by JSR Corporation, "N222L"], 5 parts by mass of zinc oxide, 2 parts by mass of stearic acid, 1 part by mass of tetrabutylammonium perchlorate (reagent), 0.8 parts by mass of sulfur powder and 10 parts by mass of a polyester plasticizer [manufactured by DIC Corporation, [POLYCIZER W-4000] for 10 minutes by means of a sealed mixer of which the temperature was regulated at 50° C.

Next, a solid columnar iron bar having a diameter of 12 mm was provided as an axis body, and an adhesive was applied to the outer circumferential surface thereof. After this axis body was set in a hollow space of a die for roll forming, the prepared composition for forming an elastic layer as described above was injected into the hollow space, and heated at 190° C. for 30 minutes to be cured, and then demolded.

Thus, a conductive roll of a single-layer structure having a rubber elastic layer (thickness: 2 mm) containing NBR as a polymer component on the outer circumference of the axis body was prepared.

Next, a composition for forming a surface layer having a concentration of 20% by mass was prepared by thoroughly mixing 90 parts by mass of a urethane resin [manufactured by NIPPON POLYURETHANE INDUSTRY CO., LTD., "NIPPOLAN 5199"] as a binder resin, 10 parts by mass of a polyol containing a C=C bond [manufactured by Idemitsu Petrochemical Co., Ltd., "Poly bdR-45HT"], 40 parts by mass of isocyanate MDI [manufactured by NIPPON POLYURETHANE INDUSTRY CO., LTD., "CORONATE L"] as a crosslinking agent and 30 parts by mass of carbon black [manufactured by Mitsubishi Chemical Corporation, "Dia Black #3030"] as an electron conducting agent by means of a triple roll and dissolving this mixture in an organic solvent (methyl ethyl ketone).

Next, a solid columnar iron bar having a diameter of 12 mm was provided as an axis body, and an adhesive was applied to the outer circumferential surface thereof. After this axis body was set in a hollow space of a die for roll forming, liquid silicone rubber containing a conducting agent [manufactured by Shin-Etsu Chemical Co., Ltd., "X-34-264A/B (A/B mixing ratio=50/50)"] was injected into the hollow space, and heated at 190° C. for 30 minutes to be cured, and then demolded. Thus, a rubber elastic layer (thickness: 2 mm) containing silicone rubber on the outer circumference of the axis body was formed.

Next, after the prepared composition for forming a surface layer as described above was coated, by the roll coating method, onto the outer circumferential surface of the rubber elastic layer, and then dried at 180° C. for 60 minutes to form a surface layer (thickness: 10 µm). Thus, a conductive roll of a dual-layer structure having a surface layer (thickness: 10 µm) containing a urethane resin as a polymer component on the outer circumference of a rubber elastic layer formed on the outer circumference of the axis body was prepared.

<Preparation of Conductive Belt as Material to be Treated>

One type of conductive belt, to which treatment with a surface treatment liquid was to be subjected, was prepared as follows.

A composition for forming a base layer was prepared by mixing 100 parts by mass of a polyamide imide resin [manufactured by TOYOBO CO., LTD., "HR-16NN"], 10 parts by mass of carbon black [manufactured by DENKI KAGAKU KOGYO KABUSHIKI KAISHA, "DENKA BLACK HS-100"] and 800 parts by mass of NMP (solvent).

Next, the prepared composition for forming a base layer, as described above, was helically coated onto the outer circumferential surface of an aluminum cylindrical die by use of a dispenser, while the die was rotated, in the vertical state, around the axis. Thus, the entire coating film composed of a continuous body of helical coating films was formed. Then, heating treatment was applied to the entire coating film formed, under the condition that the temperature was increased from ambient temperature up to 250° C. over 2 hours, and thereafter kept at 250° C. for 1 hour. Thus, a base layer (thickness: 80 µm) was formed on the outer circumference of the cylindrical die.

Then, a composition for forming a rubber elastic layer was prepared by mixing 100 parts by mass of liquid NBR [NH$_2$ modified NBR manufactured by Emerald Performance Materials Inc., "ATBN 1300×45"], 35 parts by mass of block isocyanate as a crosslinking agent [manufactured by NIPPON POLYURETHANE INDUSTRY CO., LTD., "COLONATE 2507"] and cyclohexanone as a solvent (solvent rate: 30% by mass) by means of an air stirrer.

Next, the prepared composition for forming a rubber elastic layer, as described above, was helically coated onto the outer circumferential surface of the base layer by use of a dispenser, while the cylindrical die in which the base layer had been formed was rotated, in the vertical state, around the axis. Thus, the entire coating film composed of a continuous body of helical coating films was formed. Then, heating treatment was applied to the entire coating film formed, under the condition that the temperature was increased from ambient temperature up to 170° C. over 5 minutes, and thereafter kept at 170° C. for 30 minutes. Thus, a rubber elastic layer (thickness: 170 µm) was formed on the outer circumference of the base layer. Then, air was blown between the cylindrical die and the base layer to remove the cylindrical die, thereby preparing a conductive belt having a rubber elastic layer containing NBR as a polymer component on the outer circumferential surface of the base layer formed in a cylindrical shape.

<Preparation of Conductive Rolls of Samples R1 to R10>

In combinations of the materials to be treated and the surface treatment liquids as indicated in Table 2, the predetermined surface treatment liquid was contacted with the surface of the rubber elastic layer (polymer component: NBR) of the conductive roll. Specifically, the conductive roll was immersed in the predetermined surface treatment liquid having a temperature of 25° C. for 30 seconds. Thereafter, the surface of the rubber elastic layer was cleaned with pure water having a temperature of 25° C. for 30 seconds, and dried by air blowing for 10 seconds.

Then, an ultraviolet irradiation device [manufactured by Eye Graphics Co., Ltd., "UB031-2A/BM] was used to irradiate the surface of the rubber elastic layer with ultraviolet rays (UV). At this time, the distance between the ultraviolet lamp of the ultraviolet irradiation device (of mercury lamp system) and the surface of the rubber elastic layer was defined as 200 mm. Also, ultraviolet irradiation was carried out under the conditions: ultraviolet intensity: 100 mW/cm$^2$ and irradiation time: 30 seconds.

Thus, conductive rolls of samples R1 to R3 and R7 to R10 were prepared. In the meantime, a conductive roll of sample R4 was prepared without ultraviolet irradiation after contact with the surface treatment liquid. Also, a conductive roll of sample R5 was prepared without contact with a surface treatment liquid or ultraviolet irradiation. Also, a conductive roll of sample R6 was prepared by carrying out ultraviolet irradiation without contact with a surface treatment liquid.

<Preparation of Conductive Rolls of Samples R11 to R13>

In combinations of the materials to be treated and the surface treatment liquids as indicated in Table 3, the predetermined surface treatment liquid was contacted with the surface of the surface layer (polymer component: urethane resin) of the conductive roll. Specifically, the conductive roll was immersed in the predetermined surface treatment liquid having a temperature of 25° C. for 30 seconds. Thereafter, the surface of the surface layer was cleaned with pure water having a temperature of 25° C. for 30 seconds, and dried by air blowing for 10 seconds.

Then, the above-described ultraviolet irradiation device was used to irradiate the surface of the rubber elastic layer with ultraviolet rays (UV). At this time, the distance between the ultraviolet lamp of the ultraviolet irradiation device and the surface of the surface layer was defined as 200 mm. Also, ultraviolet irradiation was carried out under the conditions: ultraviolet intensity: 100 mW/cm$^2$ and irradiation time: 30 seconds.

Thus, a conductive roll of sample R11 was prepared. In the meantime, a conductive roll of sample R12 was prepared without contact with a surface treatment liquid or ultraviolet irradiation. Also, a conductive roll of sample R13 was prepared without ultraviolet irradiation after contact with the surface treatment liquid.

<Preparation of Conductive Belts of Samples B1 to B3>

In combinations of the materials to be treated and the surface treatment liquids as indicated in Table 4, the predetermined surface treatment liquid was contacted with the surface of the rubber elastic layer (polymer component: NBR) of the conductive belt. Specifically, the conductive belt was immersed in the predetermined surface treatment liquid having a temperature of 25° C. for 30 seconds. Thereafter, the surface of the surface layer was cleaned with pure water having a temperature of 25° C. for 30 seconds, and dried by air blowing for 10 seconds.

Then, the above-described ultraviolet irradiation device was used to irradiate the surface of the rubber elastic layer with ultraviolet rays (UV). At this time, the distance between the ultraviolet lamp of the ultraviolet irradiation device and the surface of the rubber elastic layer was defined as 200 mm. Also, ultraviolet irradiation was carried out under the following conditions: ultraviolet intensity of 100 mW/cm$^2$ and irradiation time of 30 seconds.

Thus, a conductive belt of sample B1 was prepared. In the meantime, a conductive belt of sample B2 was prepared without contact with a surface treatment liquid or ultraviolet irradiation. Also, a conductive belt of sample B3 was prepared without ultraviolet irradiation after contact with the surface treatment liquid.

<Measurement of Element Concentration Distribution Over Depth Direction from Outermost Surface of Polymer Body>

A scanning type X ray photoelectron spectrometer (XPS/ESCA) [manufactured by ULVAC-PHI INCORPORATED, "PHI5000 VersaProbe"] was used to measure changes of the element concentration in the depth direction from the outermost surface of a sample while the surface of the sample was etched with an argon ion cluster.

Specifically, the surfaces of the respective samples were firstly etched under the following etching conditions and neutralizing conditions for 100 minutes.

—Etching Conditions—

Ion source: Ar 2500+; acceleration voltage: 10 kV (10 nA Emission); sample current: 35 nA; Zalar rotation: present; etched region: 2 mm×2 mm —Electrification Neutralizing Conditions—

Neutralizing gun: 1.1 V (20 µA Emission)

Ion gun: 7 V (7 mA Emission)

Next, the depth of the part etched by etching for 100 minutes was measured by a surface roughness meter to measure the etching rate for the respective samples. For example, for the sample R1, the depth of the part etched by the etching for 100 minutes was 1612 nm. Therefore, the etching rate for the sample R1 under the etching conditions was 16.12 nm/min.

Next, changes of the amounts of the respective elements over the depth direction from the outermost surface of a sample were measured while the surfaces of the respective samples were etched under the etching conditions identical with the above ones. The measurement conditions at this time are as indicated below.

—Measurement Conditions—

X ray beam: (diameter: 200 µm, 25 W, 15 kV); measurement area: 300 µm×300 µm; signal capturing angle: 45.0°

<Toner Release Property>

(Toner Fixation Resistance by Toner Fixation Test)

The conductive rolls and conductive belts were put in a heating bath under the conditions of 50° C. and 95% humidity for 1 week in the state where a yellow toner for a color laser beam printer [manufactured by Canon Inc., "LBP 5050"] was uniformly sprinkled on the roll surfaces of the respective conductive rolls and the belt surfaces of the respective conductive belts. The conductive rolls and conductive belts were then removed and cooled to room temperature, and, thereafter, the roll surfaces of the conductive rolls and the belt surfaces of the conductive belts were air blown. Then, a laser microscope [manufactured by KEYENCE CORPORATION, "VK-X200"] was used to observe the roll surfaces of the conductive rolls and the belt surfaces of the conductive belts, respectively. The case where the area of the fixed toner with respect to the entire surface area was 5% or less was regarded as excellent in toner fixation resistance determined by the toner fixation test, and ranked as "A." The case where the area of the fixed toner was beyond 5% and 15% or less was regarded as good in toner fixation resistance determined by the toner fixation test, and ranked as "B." The case where the area of the fixed toner was beyond 15% was regarded as poor in toner fixation resistance determined by the toner fixation test, and ranked as "C."

(Toner Fixation Resistance Determined by Real Machine Durability Test)

The respective conductive rolls were incorporated as developing rolls into a commercially available color printer

[manufactured by Hewlett-Packard Japan, Ltd., "Color Laser Jet 4700dn"] to visually evaluate the fixation state of a toner onto the roll surfaces after 20,000-sheet printing. The case where no filming due to the fixation of the toner onto the roll surfaces was caused was regarded as excellent in toner fixation resistance determined by the real machine durability test, and ranked as "A." The case where the fixation of the toner onto the roll surfaces was observed, but hardly affected image quality, and thus was tolerable was regarded as good in toner fixation resistance determined by the real machine durability test, and ranked as "B." The case where filming due to the fixation of the toner onto the roll surfaces was caused was regarded as poor in toner fixation resistance determined by the real machine durability test, and ranked as "C."

<Friction Coefficient>
(Initial Dynamic Friction Coefficient)

Vertical load W of 100 g was applied by a contact (made from a steel ball having a diameter of 3 mm) to the conductive roll itself fixed onto a stage of a static/dynamic friction coefficient measuring instrument [manufactured by Kyowa Interface Science Co., Ltd., "Triboster 500"] or the surface of a test piece of the conductive belt fixed on the stage (including the belt surface and cut out into a size of 1 cm or more), and the stage was moved by 1 cm in the horizontal direction at a moving speed of 7.5 mm/sec. in this state. The initial dynamic friction coefficient (F/W) on the roll surface of the conductive roll and the belt surface of the conductive belt was thus calculated from frictional force F generated between the conductive roll or test piece of the conductive belt and the contact.

(Dynamic Friction Coefficient after Toner Fixation Test)

The roll surface of the conductive roll and the belt surface of the conductive belt after the toner fixation test were carefully wiped off with a nonwoven fabric impregnated with methanol. Thereafter, the dynamic friction coefficient after the toner fixation test was calculated for the roll surface and the belt surface, similarly to the measurement of the initial dynamic friction coefficient.

(Chargeability)

The respective conductive rolls were assembled as developing rolls into the cartridge of a commercially available color printer [manufactured by Hewlett-Packard Japan, Ltd., "Color Laser Jet 4700dn"], and left as they were in an environment of 32.5° C.×85% RH for 12 hours or more. Thereafter, one solid image was output in this environment, and the amount of electric charge in the toner on the developing rolls at that time and the toner weight were measured by the suction method. The value of the toner electric charge amount Q/toner weight M was defined as the amount of electric charge [−μC/g]. The case where the amount of electric charge was −25 [−μC/g] or less was regarded as excellent in toner chargeability, and ranked as "A." The case where the amount of electric charge was −20 [−μC/g] or more and less than −25 [−μC/g] was regarded as good in toner chargeability, and ranked as "B." The case where the amount of electric charge was −20 [−μC/g] or more was regarded as poor in toner chargeability, and ranked as "C."

(Crack Caused by Real Machine Durability Test)

Figure 10:
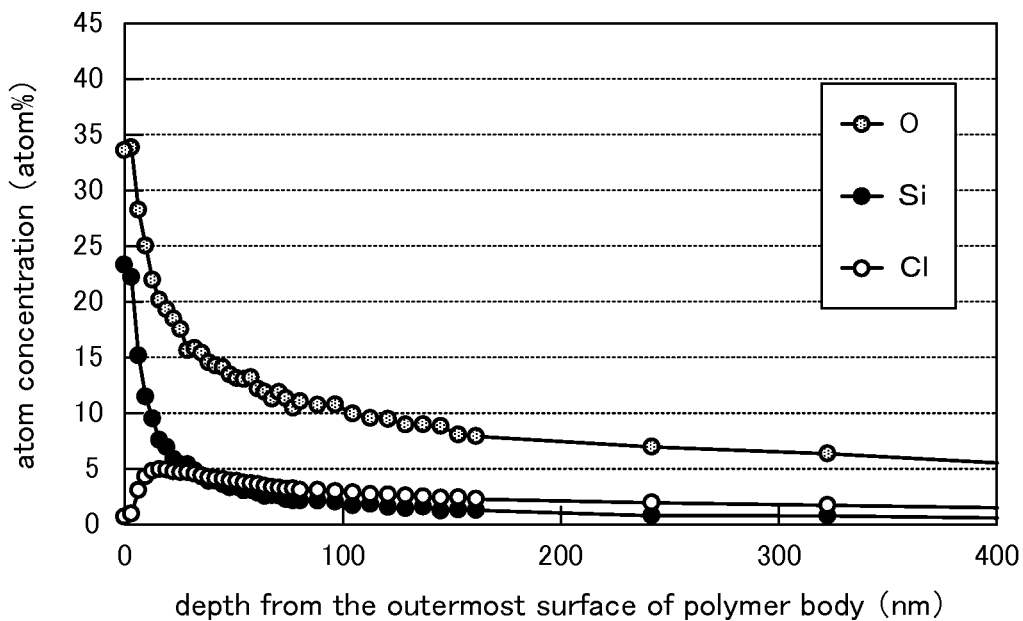
FIG. 10 is a graph showing the relation between the depth from the outermost surface of sample R1 and the concentrations of the respective atoms.
Figure 11:
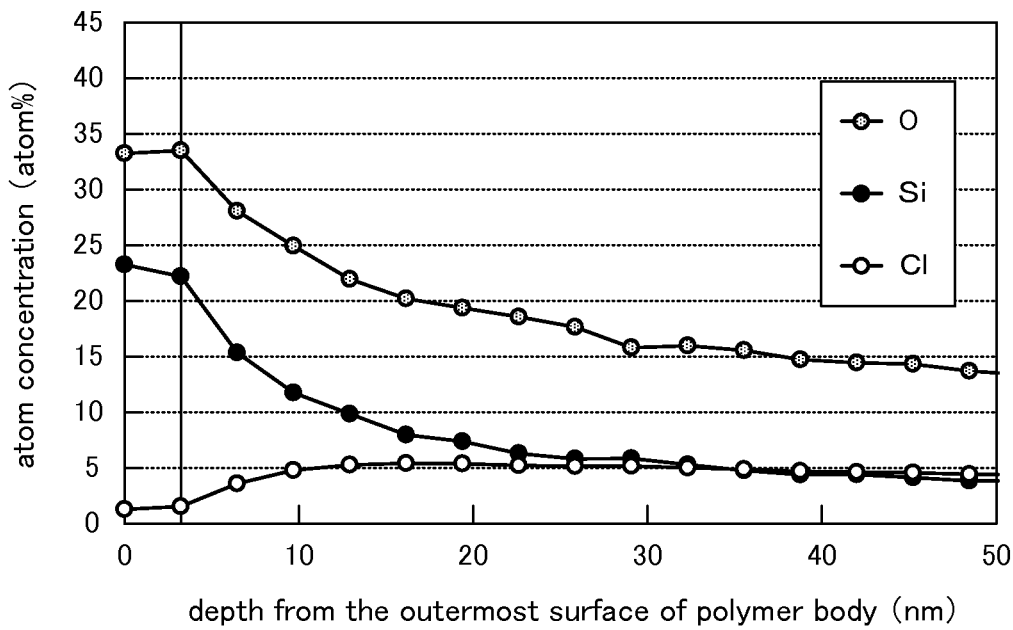
FIG. 11 is a graph showing the range of up to the depth of 50 nm from the outermost surface of the sample R1 in FIG. 10 in an enlarged manner.

The respective conductive belts were assembled into a commercially available full-color digital multi-functional machine [manufactured by Konica Minolta Business Technologies, Inc., "bizhab C550"] as an intermediate transfer belt, and 100,000 images were output in an environment of 23.5° C.×53% RH (test pattern printing). Thereafter, the belt surfaces were visually observed. The case where no crack was observed was regarded as excellent in crack suppressing effect, and ranked as "A." The case where some cracks were observed, but hardly affected image quality, and thus was tolerable was regarded as good in crack suppressing effect, and ranked as "B." The case where so many cracks as affected image quality were observed was regarded as poor in crack suppressing effect, and ranked as "C." The results obtained are indicated in Tables 2 to 4 together with the sample preparing conditions. Also, FIGS. 10 and 11 show the element concentration distribution over the depth direction from the outermost surface of the sample R1.

TABLE 2

| Polymer Body | | Sample R1 | Sample R2 | Sample R3 | Sample R4 | Sample R5 | Sample R6 | Sample R7 | Sample R8 | Sample R9 | Sample R10 |
|---|---|---|---|---|---|---|---|---|---|---|---|
| Polymer Body | Material to be treated | Electrically conductive roll (Axis body + Rubber elastic layer) | | | | | | | | | |
| | Portion to be applied | Rubber elastic layer | | | | | | | | | |
| | Polymer component | NBR | | | | | | | | | |
| | Type of surface treatment liquid to be used | C1 | C2 | C3 | C1 | — | — | D1 | D2 | D3 | A1 |
| | Application of energy | UV | UV | UV | — | — | UV | UV | UV | UV | UV |
| Element concentration distribution of polymer body | Kinds of atom peculiar to functional group | Si | O, Si | N, Si | Si | — | — | Si | — | — | Si |
| | Depth when the above atom becomes maximum [nm] | 0 | 0 | 0 | 0 | — | — | 0 | — | — | 0 |
| | Depth when chlorine atom becomes nmximum [nm] | 10-20 | 20-30 | 20-30 | 10-20 | — | — | — | 0 | — | 10-20 |
| Evaluation | Toner release property | | | | | | | | | | |
| | Toner fixation resistance by toner fixation test | A | A | A | A | C | C | C | B | C | B |
| | Toner fixation resistance by real machine durability test | A | A | A | B | C | C | C | C | C | B |
| | Friction coefficient | | | | | | | | | | |
| | Initial dynamic friction coefficient | 0.1 | 0.1 | 0.1 | 0.1 | 1.3 | 0.6 | 0.2 | 0.3 | 0.6 | 0.2 |
| | Dynamic friction coefficient after toner fixation test | 0.1 | 0.1 | 0.1 | 0.2 | 1.4 | 0.8 | 0.8 | 0.5 | 0.8 | 0.2 |
| | Chargeability | | | | | | | | | | |
| | The amount of electric charge Q/M [−μC/g] | B | A | A | B | — | — | — | — | — | C |

TABLE 3

| | | Sample R11 | Sample R12 | Sample R13 |
|---|---|---|---|---|
| Polymer body | Material to be treated | Electrically conductive roll (Axis body + Rubber elastic layer + Surface layer) | | |
| | Portion to be applied | Surface layer | | |
| | Polymer component | Urethane resin | | |
| Type of surface treatment liquid to be used | | C1 | — | A1 |
| Application of energy | | UV | — | — |
| Element concentration distribution of polymer body | Kinds of atom peculiar to functional group | Si | | Si |
| | Depth when the above atom becomes maximum [nm] | 0 | — | 0 |
| | Depth when chlorine atom becomes maximum [nm] | 10-20 | — | 10-20 |
| Evaluation | Toner release property | | | |
| | Toner fixation resistance by toner fixation test | A | C | B |
| | Toner fixation resistance by real machine durability test | A | C | B |
| | Friction coefficient | | | |
| | Initial dynamic friction coefficient | 0.1 | 0.8 | 0.2 |
| | Dynamic friction coefficient after toner fixation test | 0.1 | 1.2 | 0.2 |

TABLE 4

| | | Sample B1 | Sample B2 | Sample B3 |
|---|---|---|---|---|
| Polymer body | Material to be treated | Electrically conductive belt (Base layer + Rubber elastic layer) | | |
| | Portion to be applied | Rubber elastic layer | | |
| | Polymer component | NBR | | |
| Type of surface treatment liquid to be used | | C1 | — | A1 |
| Application of energy | | UV | — | — |
| Element concentration distribution of polymer body | Kinds of atom peculiar to functional group | Si | | Si |
| | Depth when the above atom becomes maximum [nm] | 0 | — | 0 |
| | Depth when chlorine atom becomes maximum [nm] | 10-20 | — | 10-20 |
| Evaluation | Toner Release Property | | | |
| | Toner fixation resistance by toner fixation test | A | C | B |
| | Friction coefficient | | | |
| | Initial dynamic friction coefficient | 0.2 | 1.9 | 0.4 |
| | Dynamic friction coefficient after toner fixation test | 0.2 | 1.8 | 0.4 |
| | Crack caused by real machine durability test | A | C | A |

The following matter can be understood from Table 2. The sample R5 was prepared without contact of a surface treatment liquid with the outermost surface of the rubber elastic layer or ultraviolet irradiation. Therefore, this sample has high tackiness on the rubber elastic surface, poor toner release property and very large friction coefficient.

The sample R6 was prepared by ultraviolet irradiation without contact of a surface treatment liquid with the outermost surface of the rubber elastic layer. The surface of the rubber elastic layer was cured upon ultraviolet irradiation so that the hardness was increased, and the friction coefficient became smaller accordingly, but the value is still large. Therefore, such a method is difficult to sufficiently reduce the friction of the surface of the rubber elastic layer.

The sample R7 was prepared by contacting the surface treatment liquid D1 prepared without incorporation of the (A) component with the outermost surface of the rubber elastic layer. Therefore, an organic group having a silicone group cannot be bound via an isocyanuric acid skeleton to the surface of the rubber elastic layer. Therefore, this sample has poor toner release property of the rubber elastic layer surface and poor toner fixation resistance. The friction coefficient of the surface of the rubber elastic layer is also relatively large.

The sample R8 was prepared by contacting the surface treatment liquid D2 prepared by incorporating the (A) component but no (B) component with the outermost surface of the rubber elastic layer, as compared with the sample R7. Thus, an organic group having a silicone group cannot be bound via an isocyanuric acid skeleton to the surface of the rubber elastic layer. Therefore, this sample has poor toner release property of the rubber elastic layer surface and has poor toner fixation resistance. The friction coefficient of the surface of the rubber elastic layer is also relatively large.

The sample R9 was prepared by contacting the surface treatment liquid D3 prepared without incorporation of the (A) component or the (B) component with the outermost surface of the rubber elastic layer. Thus, an organic group having a silicone group cannot be bound via an isocyanuric acid skeleton to the surface of the rubber elastic layer. Therefore, this sample has poor toner release property of the rubber elastic layer surface and has poor toner fixation resistance. The friction coefficient of the surface of the rubber elastic layer is also relatively large.

The sample R10 was prepared by contacting the surface treatment liquid A1 prepared by incorporating the (A) component, the (B) component and the (D) component with the outermost surface of the rubber elastic layer. Thus, an organic group having a silicone group can be bound via the isocyanuric acid skeleton to the surface of the rubber elastic layer. Therefore, this sample has better toner release property of the rubber elastic layer surface, a more improved toner fixation resistance, and a smaller friction coefficient of the surface of the rubber elastic layer than the above-described samples R7 to R9. However, the surface treatment liquid A1 was prepared without incorporation of the (C) component. Therefore, it is difficult to cause direct binding of the organic compound as the (B) component adhered as an unreacted component to the surface of the rubber elastic layer upon contact with the surface treatment liquid A1, as an organic group having a silicon group, without interposing an isocyanuric acid skeleton. Hence, this sample cannot develop extra toner fixation resistance accordingly, and also exhibits a limited reduction in friction coefficient.

Contrary to these samples, the sample R1 was prepared by contacting the surface treatment liquid C1 prepared by incorporation of the (A) to (D) components with the outermost surface of the rubber elastic layer and also ultraviolet irradiation. Thus, an organic group having a silicone group can be bound via the isocyanuric acid skeleton to the surface of the rubber elastic layer (formation of the first binding parts). Further, the organic compound as the (B) component adhered as an unreacted component to the surface of the rubber elastic layer upon contact with the surface treatment liquid C1 can be directly bound as an organic group having the functional group without interposing an isocyanuric acid skeleton (formation of the second binding parts). Thus, the sample R1 can develop extra toner fixation resistance due to the functional group possessed by the second binding parts, and can develop a further-reduced friction coefficient. Further, this sample can develop the surface function over a long term, and has excellent durability. As can be understood from the results of the sample R4, the organic compound as the (B) component adhered as an unreacted component to the surface of the rubber elastic layer cannot be directly bound as an organic group having the functional group without interposing an isocyanuric acid skeleton when ultraviolet irradiation is omitted even if the surface treatment liquid C1 prepared by incorporation of the (A) to (D) components with the outermost surface of the rubber elastic layer. Therefore, it is difficult to sufficiently improve the durability.

Also, the samples R2 and R3 employ the surface treatment liquids C2 and C3 prepared by incorporating an organic compound having a silicone group and an organic compound having an ester group or an amide group as the (B) component. Therefore, these samples have the above-described surface function due to the silicone group, and, additionally, toner chargeability due to the ester group or the amide group, similarly to the sample R1.

The following matter can be understood from Table 3. The sample R12 was prepared without contact of a surface treatment liquid with the outermost surface of the surface layer or ultraviolet irradiation. Therefore, this sample has poor toner release property of the surface of the surface layer and a very large friction coefficient. The sample R13 is difficult to cause direct binding of the organic compound as the (B) component adhered as an unreacted component to the surface of the surface layer upon contact with the surface treatment liquid A1, as an organic group having a silicone group, without interposing an isocyanuric acid skeleton, similarly to the above-described sample R10. Hence, this sample cannot develop extra toner fixation resistance accordingly, and also exhibits a limited reduction in friction coefficient.

In contrast, the sample R11 ensures direct binding of the organic compound as the (B) component adhered as an unreacted component to the surface of the surface layer upon contact with the surface treatment liquid C1 as an organic group having the functional group without interposing an isocyanuric acid skeleton, similarly to the above-described sample R1 (formation of the second binding parts). Thus, the sample R11 can develop extra toner fixation resistance due to the functional group possessed by the second binding parts, and can develop a further-reduced friction coefficient. Further, this sample can develop the surface function over a long term, and has excellent durability.

The following matter can be understood from Table 4. The sample B1 was prepared without contact of a surface treatment liquid with the outermost surface of the rubber elastic layer or ultraviolet irradiation. Therefore, this sample has poor toner release property of the surface of the rubber elastic layer and a very large friction coefficient. Also, this sample causes cracks in the real machine durability test, and has poor durability. The sample B2 is difficult to cause direct binding of the organic compound as the (B) component adhered as an unreacted component to the surface of the rubber elastic layer upon contact with the surface treatment liquid A1, as an organic group having a silicon group, without interposing an isocyanuric acid skeleton, similarly to the above-described samples R10 and R13. Hence, this sample cannot develop extra toner fixation resistance accordingly, and also exhibits a limited reduction in friction coefficient.

In contrast, the sample B1 ensures direct binding of the organic compound as the (B) component adhered as an unreacted component to the surface of the surface layer upon contact with the surface treatment liquid C1 as an organic group having the functional group without interposing an isocyanuric acid skeleton, similarly to the above-described samples R1 and R11 (formation of the second binding parts). Thus, the sample B1 can develop extra toner fixation resistance due to the functional group possessed by the second binding parts, and can develop a further-reduced friction coefficient. Further, this sample can develop the surface function over a long term, and has excellent durability. Also, this sample is less likely to cause cracks in the real machine durability test, and is excellent in durability also in this regard.

The following matter can be understood from FIGS. 10 and 11. The sample R1 has a rubber elastic layer composed of a modified polymer body. For the concentration distribution of Si atom specific to the silicone group contained in the (B) component of the surface treatment liquid C1 used in surface treatment in this sample R1, it can be seen that the Si atom concentration is maximum at the outermost surface of the sample R1. Also, it can be seen that the sample R1 has a high Si atom concentration within a range up to about 3 nm in depth from the outermost surface thereof. From these facts, the sample R1 contains many silicone groups within a region up to about 3 nm in depth from the outermost surface thereof, and the region is considered to be almost filled with the silicone groups. Also, it can be understood that, as the depth from the outermost surface of the sample R1 becomes deeper than about 3 nm, the Si atom concentration is gradually lowered. From this fact, the sample R1 is considered to contain silicone groups also within a region deeper than the region. In the meantime, the depth at which the Si atom concentration was reduced by half was 10 nm, and the depth at which the Si atom concentration was 1 atom % or less was 160 nm. FIGS. 10 and 11 also show the concentration distribution of the 0 atoms contained in the silicone groups for reference purposes.

Also, the sample R1 employs trichloroisocyanuric acid as the (A) component of the surface treatment liquid C1. Therefore, chlorine atoms derived from the trichloroisocyanuric acid exist in the surface of the sample R1. It can be understood that, for the concentration distribution of the chlorine atoms in this sample R1, the concentration of the chlorine atoms is maximum in a position deeper than the outermost surface of the sample R1. Also, it can be seen that the sample R1 is such that the depth at which the concentration of the chlorine atoms is maximum is located in a position deeper than the above-described depth at which the concentration of the Si atoms is maximum. Also, it can be seen that the concentration distribution of the chlorine atoms in the sample R1 is such that, as the depth from the outermost surface of the sample R1 increases, the concentration of the chlorine atoms gradually increases, becomes maximum and thereafter gradually reduces. From these facts, it can be understood that there are less chlorine atoms than Si atoms near the outermost surface of the sample R1. In the meantime, the depth at which the chlorine atom concentration was reduced by half was 140 nm, which was deep as compared with the case of Si atoms. Also, the depth at which the chlorine atom concentration was 1 atom % or less was 650 nm, which was deep as compared with the case of Si atoms. The element analysis results given above indicate that, due to the presence of a functional group in a position deeper in the depth direction from the outermost surface of the polymer body, the surface function due to the functional group is easily maintained over a long term, which is advantageous in improving the durability.

Example of the present invention has been explained in detail above. However, the present invention is not limited to the Example, and can be variously changed within the scope not departing from the spirit of the present invention.

The invention claimed is:

1. A conductive member for an electrophotographic image forming apparatus using a modified polymer body as a material for a portion including an outermost surface of the conductive member, wherein
the modified polymer body comprises:
a polymer body composed of a polymer material containing carbon-carbon double bonds;
first binding parts bound to the surface of the polymer body, the first binding parts being such that an organic group having a functional group is bound via an isocyanuric acid skeleton to the surface of the polymer body; and
second binding parts bound to the surface of the polymer body, the second binding parts being such that an organic group having a functional group is directly bound to the surface of the polymer body without interposing an isocyanuric acid skeleton,
wherein the organic group in the first binding parts and the organic group in the second binding parts are groups both derived from an identical organic compound.

2. The conductive member for an electrophotographic image forming apparatus according to claim 1,
wherein the functional group in both the first binding parts and the second binding parts is one or is one or two or more selected from a silicone group, a fluorine-containing group, an ester group, an amide group, an amino group, an epoxy group, a carbonyl group, a hydroxy group, a carboxylic acid group, a sulfonic acid group, an imide group, an ether group, an aryl group, an azo group, a diazo group, a nitro group, a heterocyclic group, a mesoionic group, a halogen group, an imino group, an alkyl group, an acyl group, a formyl group, a urea group, a urethane group and a cyano group.

3. The conductive member for an electrophotographic image forming apparatus according to claim 1,
wherein the organic group having the functional group is a group derived from an organic compound having the functional group and the carbon-carbon double bond.

4. The conductive member for an electrophotographic image forming apparatus according to claim 1,
wherein a concentration distribution of an atom specific to the functional group over the depth direction from the outermost surface of the polymer body is such that the concentration of the atom specific to the functional group is maximum at the outermost surface of the polymer body.

5. The conductive member for an electrophotographic image forming apparatus according to claim 1,
wherein a chlorine atom exists in the surface of the polymer body, and
wherein a concentration distribution of the chlorine atom over the depth direction from the outermost surface of the polymer body is such that the concentration of the chlorine atom is maximum in a position deeper than the outermost surface of the polymer body.

6. The conductive member for an electrophotographic image forming apparatus according to claim 2,
wherein the organic group having the functional group is a group derived from an organic compound having the functional group and the carbon-carbon double bond.

7. The conductive member for an electrophotographic image forming apparatus according to claim 2,
wherein a concentration distribution of an atom specific to the functional group over the depth direction from the outermost surface of the polymer body is such that the concentration of the atom specific to the functional group is maximum at the outermost surface of the polymer body.

8. The conductive member for an electrophotographic image forming apparatus according to claim 2,
wherein a chlorine atom exists in the surface of the polymer body, and
wherein a concentration distribution of the chlorine atom over the depth direction from the outermost surface of the polymer body is such that the concentration of the chlorine atom is maximum in a position deeper than the outermost surface of the polymer body.

9. The conductive member for an electrophotographic image forming apparatus according to claim 6,
wherein a concentration distribution of an atom specific to the functional group over the depth direction from the outermost surface of the polymer body is such that the concentration of the atom specific to the functional group is maximum at the outermost surface of the polymer body.

10. The conductive member for an electrophotographic image forming apparatus according to claim 6,
   wherein a chlorine atom exists in the surface of the polymer body, and
   wherein a concentration distribution of the chlorine atom over the depth direction from the outermost surface of the polymer body is such that the concentration of the chlorine atom is maximum in a position deeper than the outermost surface of the polymer body.

11. The conductive member for an electrophotographic image forming apparatus according to claim 9,
   wherein a chlorine atom exists in the surface of the polymer body, and
   wherein a concentration distribution of the chlorine atom over the depth direction from the outermost surface of the polymer body is such that the concentration of the chlorine atom is maximum in a position deeper than the outermost surface of the polymer body.

12. The conductive member for an electrophotographic image forming apparatus according to claim 3,
   wherein a concentration distribution of an atom specific to the functional group over the depth direction from the outermost surface of the polymer body is such that the concentration of the atom specific to the functional group is maximum at the outermost surface of the polymer body.

13. The conductive member for an electrophotographic image forming apparatus according to claim 3,
   wherein a chlorine atom exists in the surface of the polymer body, and
   wherein a concentration distribution of the chlorine atom over the depth direction from the outermost surface of the polymer body is such that the concentration of the chlorine atom is maximum in a position deeper than the outermost surface of the polymer body.

14. The conductive member for an electrophotographic image forming apparatus according to claim 12,
   wherein a chlorine atom exists in the surface of the polymer body, and
   wherein a concentration distribution of the chlorine atom over the depth direction from the outermost surface of the polymer body is such that the concentration of the chlorine atom is maximum in a position deeper than the outermost surface of the polymer body.

15. The conductive member for an electrophotographic image forming apparatus according to claim 3,
   wherein the organic compound has a chemical structure represented by Formula 1:

[Chemical Formula 1]

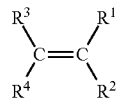

(Formula 1)

wherein $R^1$ is $-X^2-X^1$ or $-X^1$; $X^1$ is one or two or more selected from a silicone group, a fluorine-containing group, an ester group, an amide group, an amino group, an epoxy group, a carbonyl group, a hydroxy group, a carboxylic acid group, a sulfonic acid group, an imide group, an ether group, an aryl group, an azo group, a diazo group, a nitro group, a heterocyclic group, a mesoionic group, a halogen group, an imino group, an alkyl group, an acyl group, a formyl group, a urea group, a urethane group and a cyano group; $X^2$ is one selected from an ester group, an ether group, a carbonyl group, an urethane group and an amide group; and $R^2$ to $R^4$ are hydrogen atoms or alkyl groups.

16. The conductive member for an electrophotographic image forming apparatus according to claim 3,
   wherein the organic compound has a chemical structure represented by Formula 5:

[Chemical Formula 2]

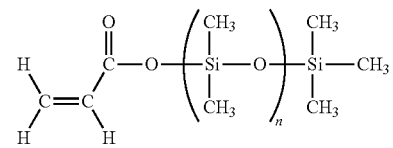

(Formula 5)

wherein n is a positive integer.

17. The conductive member for an electrophotographic image forming apparatus according to claim 3,
   wherein the organic compound has a chemical structure represented by Formula 6:

[Chemical Formula 3]

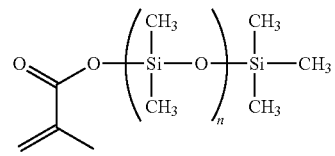

(Formula 6)

wherein n is a positive integer.

18. The conductive member for an electrophotographic image forming apparatus according to claim 3,
   wherein the organic compound has a chemical structure represented by Formula 7:

[Chemical Formula 4]

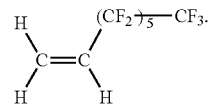

(Formula 7)

19. The conductive member for an electrophotographic image forming apparatus according to claim 1, wherein
   the first binding parts are such that the isocyanuric acid skeleton is bound to the surface of the polymer body by a C—N bond and the organic group is bound to the isocyanuric acid skeleton by a N—C bond; and
   the second binding parts are such that the organic group is bound to the surface of the polymer body by a C—C bond.

20. The conductive member for an electrophotographic image forming apparatus according to claim 1, wherein
   the conductive member is a conductive roll or a conductive belt.

21. The conductive member for an electrophotographic image forming apparatus according to claim 1,
wherein the organic group having the functional group in both the first binding parts and the second binding parts is derived from an organic compound selected from the group consisting of organic compounds having a chemical structure represented by formula 5, formula 6, or formula 7 below:

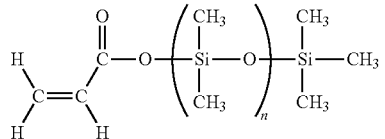
(Formula 5)

wherein n is a positive integer;

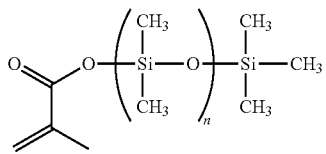
(Formula 6)

wherein n is a positive integer; and

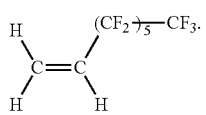
(Formula 7)

* * * * *